United States Patent [19]
Agrawal

[11] Patent Number: 5,636,210
[45] Date of Patent: Jun. 3, 1997

[54] ASYNCHRONOUS TRANSFER MODE PACKET SWITCH

[76] Inventor: Jagannath P. Agrawal, 12209 Perry La., Overland Park, Kans. 66213

[21] Appl. No.: 510,594

[22] Filed: Aug. 2, 1995

[51] Int. Cl.$^6$ .................................................. H04L 12/56
[52] U.S. Cl. ........................... 370/390; 370/395; 370/411; 370/418
[58] Field of Search ........................... 370/60, 60.1, 61, 370/58.1, 58.2, 58.3, 53, 54, 94.1

[56] References Cited

U.S. PATENT DOCUMENTS

| | | | |
|---|---|---|---|
| 4,763,319 | 8/1988 | Rozenblit . | |
| 4,813,038 | 3/1989 | Lee | 370/60 |
| 4,879,712 | 11/1989 | Littlewood | 370/60 |
| 5,130,984 | 7/1992 | Cisneros . | |
| 5,202,885 | 4/1993 | Schrodi et al. | 370/60 |
| 5,229,991 | 7/1993 | Turner | 370/60 |
| 5,287,346 | 2/1994 | Bianchini, Jr. et al. . | |
| 5,305,311 | 4/1994 | Lyles | 370/60 |
| 5,361,255 | 11/1994 | Diaz et al. . | |
| 5,396,491 | 3/1995 | Newman . | |
| 5,400,324 | 3/1995 | Eriksson et al. . | |
| 5,412,646 | 5/1995 | Cyr et al. . | |
| 5,416,769 | 5/1995 | Karol | 370/94.1 |

OTHER PUBLICATIONS

Fouad A. Tobagi, Timothy Kwok and Fabio M. Chiussi. Architecture, Performance, and Implementaion of the Tandem Banyan Fast Packet Switch. IEEE Journal on Selected Areas in Communictions. Vo. 9 No. 8, Oct. 1991. pp. 1173–1193.

Joseph Y. Hui. A Broadband Packet Switch for Integrated Transport. Reprinted from IEEE Journal on Selected Areas in Communications, vol. SAC–5, No. 8, Oct. 1987. pp. 1264–1273.

David X. Chen and Jon W. Mark. A Buffer Management Scheme for the SCOQ Switch Under Nonuniform Taffic Loading. IEEE Transactions on Communications, vol. 42 No. 10 Oct. 1994. pp. 2899–2907.

A.E. Eckberg and T.C. Hou. Effects of Output Buffer Sharing on Buffer Requirements in an ATDM Packet Switch. 1988 IEEE. pp. 0459–0465.

Peter Newman. A Fast Packet Switch for the Integrated Services Backbone Network. Reprinted from IEEE Journal on Selected Areas in Communications, vol. 6, No. 9, Dec. 1988. pp. 1468–1479.

C.L. Tarng and J.S. Meditch. A High Performance Copy Network For B–ISDN. IEEE. pp. 0171–0180.

Mark J. Karol, Michael G. Hluchyj and Samuel P. Morgan. Input Versus Output Queueing on a Space–Division Packet Switch. IEEE Transactions on Communications. vol. Com–35, No. 12. Dec. 1987. pp. 1347–1356.

Tony T. Lee. A Modular Architecture for Very Large Packet Switches. IEEE Transactions on Communications, vol. 38, No. 7, Jul. 1990. pp. 1097–1106.

A. Forcina, T. Di Stefano and E. Taormina. A Multicast Broadband Switching Module in a Hybrid ATM Environment. 1989 IEEE. pp. 0111–0117.

L. Rodney Goke and G.J. Lipovski. Banyan Networks For Partitioning Multiprocessor Systems, pp. 21–28.

(List continued on next page.)

*Primary Examiner*—Wellington Chin
*Assistant Examiner*—Huy D. Vu
*Attorney, Agent, or Firm*—Hovey, Williams, Timmons & Collins

[57] ABSTRACT

An asynchronous transfer mode packet switch for use in a Broadband Integrated Services Digital Network is disclosed. The asynchronous transfer mode packet switch is highly modular and allows expansion of the switch to handle applications having less than eight input and output devices to applications having up to $2^{14}$ input and output devices. The preferred asynchronous transfer mode packet switch is constructed as either a single-stage switch for routing data packets between up to $2^6$ input and output devices, a two-stage switch for routing packets between up to $2^{10}$ input and output devices, or a three-stage switch for routing packets between up to $2^{14}$ input and output devices.

29 Claims, 15 Drawing Sheets

OTHER PUBLICATIONS

Steven E. Minzer. Broadband ISDN and Asynchronous Transfer Mode (ATM). Sep. 1989 – IEEE Communications Magazine. pp. 17–24.

Tony T. Lee and Soung C. Liew. Broadband Packet Switches Based on Dilated Interconnection Networks. IEEE Transactions on Communications, vol. 42, No. 2/3/4, Feb./Mar./Apr. 1994, pp. 732–741.

Jonathan S. Turner. Design of a Broadcast Packet Switching Network. Reprinted from IEEE Transactions on Communications, vol. 36, No. 6, Jun. 1988, pp. 734–743.

P.C. Wong and M.S. Yeung. Design and Analysis of a Novel Fast Packet Switch–Pipeline Banyan. IEEE/ACM Transactions on Networking, vol. 3, No. 1, Feb. 1995. pp. 63–69.

Satoshi Nojima, Eiichi Tsutsui, Haruki Fukuda and Masamichi Hashimoto. Integrated Services Packet Network Using Bus Matrix Switch. Reprinted from IEEE Journal on Selected Areas in Communications, vol. SAC–5, No. 8, Oct. 1987, pp. 1284–1292.

Yu–Shuan Yeh, Michael G. Hluchyj and Anthony S. Acampora. The Knockout Switch: A Simple, Modular Architecture for High–Performance Packet Switching. Reprinted from IEEE Journal on Selected Areas in Communications, vol. SAC–5, No. 8, Oct. 1987, pp. 1274–1283.

Yoshito Sakurai, Nobuhiko Ido, Shinobu Gohara and Noboru Endo. Large–Scale ATM Multistage Switching Network with Shared Buffer Memory Switches. Jan. 1991 – IEEE Communications Magazine. pp. 90–96.

Tony T. Lee. Nonblocking Copy Networks for Multicast Packet Switching. Reprinted from, IEEE Journal on Selected Areas in Communications, vol. 6, No. 9, Dec. 1988. pp. 1455–1467.

Hiroshi Suzuki, Hiroshi Nagano, Toshio Suzuki, Takao Takeuchi and Susumu Iwasaki. Output–buffer Switch Architecture for Asynchronous Transfer Mode. 1989 IEEE, pp. 0099–0103.

Yasuro Shobatake, Masahiko Motoyama, Emiko Shobatake, Takashi Kamitake, Shoichi Shimizu, Makoto Noda and Kenji Sakaue. A One–Chip Scalable 8*8 ATM Switch LSI Employing Shared Buffer Architecture. IEEE Journal on Selected Areas in Communications. vol. 9, No. 8, Oct. 1991. pp. 1248–1254.

H. Jonathan Chao. A Recursive Modular Terabit/ Second ATM Switch. IEEE Journal on Selected Areas in Communications, vol. 9, No. 8, Oct. 1991. pp. 1161–1172.

Shigeo Urushidani. Rerouting Network: A High–Performance Self–Routing Swithc for B–ISDN. IEEE Journal on Selected Areas in Communications, vol. 9, No. 8, Oct. 1991. pp. 1194–1204.

David X. Chen and Jon W. Mark. SCOQ: A Fast Packet Switch with Shared Concentration and Output Queueing. IEEE/ACM Transactions on Networking, vol. 1, No. 1, Feb. 1993. pp. 142–151.

Hiroshi Kuwahara, Noboru Endo, Mineo Ogino and Takahiko Kozaki. A shared buffer memory switch for an ATM exchange. 1989 IEEE pp. 0118–0122.

Takahiko Kozaki, Noboru Endo, Yoshito Sakurai, Osamu Matsubara, Masao Mizukami and Ken'ichi Asano. IEEE Journal on Selected Areas in Communications, vol. 9, No. 8, Oct. 1991. pp. 1239–1247.

Alan Hung and Scott Knauer. Starlight: A Wideband Digital Switch. Reprinted from the Proceedings of Globecom, 1984, pp. 121–125.

K. E. Batcher. Sorting networks and their applications Jul. 7, 1995. pp. 107–113.

James N. Giacopelli, Jason J. Hichey, William S. Marcus, W. David Sincoskie and Morgan Littlewood. Sunshine: A High–Performance Self–Routing Broadband Packet Switch Architecture. IEEE Journal on Selected Areas in Communications. vol. 9, No. 8, Oct. 1991. pp. 1289–1297.

Achille Pattavina. A Multiservice High–Performance Packet Switch for Broad–Band Networks. IEEE Transactions on Communications, vol. 38, no. 9, Sep. 1990. pp. 1607–1615.

Input/Output Configuration in a Four-Channel
Shared Control Banyan Router (SCBR)

Switching Element Configuration
in a Four-Channel SCBR

ASYNCHRONOUS TRANSFER MODE PACKET SWITCH

BACKGROUND OF THE INVENTION

1. Field of the Invention

The present invention relates to packet switches, and more particularly to an asynchronous transfer mode packet switch for use in a broadband integrated services digital network.

2. Description of the Prior Art

The broadband integrated services digital network (BISDN) has become increasingly popular in recent years as consumers' demand for high speed and high density data communications has accelerated. The BISDN offers high speed, high bandwidth capabilities while integrating voice, video, and data over a single network.

To make the fullest use of BISDN bandwidth and speed, optical fiber has been used extensively because optical fibers can carry large amounts of data at high speed. However, switching technology has not developed as rapidly as fiber technology and is currently not fast enough to take full advantage of BISDN and optical transmission capacity.

To provide a basis for the development of new switching technology and to provide for uniformity in the data transmission industry, the CCITT has developed standards for switching in BISDNs. The CCITT standards recommend the implementation of asynchronous transfer mode packet switching in BISDN applications. Asynchronous transfer mode packet switching utilizes packet switches for routing information in fixed width data packets between a plurality of inputs and outputs. Each data packet typically includes 48 bytes of data and 5 bytes of header information. The header information is used by the packet switches to route the packets asynchronously between the input and output devices. A single asynchronous transfer mode network may carry hundreds of thousands of asynchronous transfer mode packets per second.

A number of asynchronous transfer mode packet switches have been developed for use in BISDNs. Prior art asynchronous transfer mode packet switches generally fall into two categories: single stage switches and multistage switches.

The knock-out switch is a well-known example of a single stage packet switch. The knock-out switch utilizes a crossbar or similar type architecture with each output port able to access all input lines simultaneously. By using a crossbar architecture, the knock-out switch has a simple, self-routing, non-blocking, low latency configuration with a high degree of modularity and expandability.

However, the knock-out switch architecture suffers from several limitations that limit its use in broadband applications. For example, an N×N knock-out switch that accepts a maximum number of L packets in a time slot requires N packet filters and an N×L concentrator for each output port. This large number of packet filters and large concentrator significantly increases the cost and complexity of the packet switches, especially for networks with a great number of inputs and outputs.

Another limitation of the knock-out switch architecture is that it utilizes a large number of memory buffers for output buffering and requires memory speed-up to accept multiple packets simultaneously at each output port. Additionally, knock-out type switches do not include means for sorting data packets for priority and therefore require additional hardware for this function. Finally, the implementation of multicasting in a knock-out switch requires each output port to first accept all multicast packets and then to reject those that do not belong to it. This also requires additional hardware including large memory buffers to store all the multicast addresses and additional logic to determine whether to accept or reject a multicast packet at the output port.

The starlight switch is a well-known example of a multi-stage packet switch. Multi-stage packet switches use banyan networks as concentrators and routers and employ input queuing, output queuing, internal queuing, or some combination of these queuing methods. The starlight switch architecture includes a batcher sorting network, a trap network, and a banyan router. The trap network allows only one packet to arrive at an output port and recycles the remainder through the sorter during the next time slot. The packets being recycled go through a delay line to align them with the next time slot. The starlight switch is efficient and inexpensive because it incorporates shared input buffering using simple delay lines to reduce the size of the buffer requirements. Additionally, the starlight switch implements simple priority protocols without increasing the buffer size and has a low switch latency.

However, the starlight switch also suffers from several limitations that limit its utility in broadband applications. For example, to achieve low packet loss, the starlight architecture requires a large sorter and trap network, thereby increasing the number of sorting and switching elements severalfold. Additionally, the starlight architecture is not modular or expandable in small increments and requires a separate copy network, thus increasing the cost of the switch.

Another type of prior art packet switch is known as a shared buffer switch. In this data packet switching approach, all the data packets received by the switch during one cycle are written into a memory within one clock cycle and then read from memory by the output ports one at a time. These switches are also limited because they must be operated at a much higher speed for writing all the packets in one clock cycle, thus often introducing head-of-line blocking. Additionally, these switches do not offer a priority mechanism and are not modular.

Many variations of the above three types of switches have been developed including hybrid combinations. However, none of the prior art asynchronous transfer mode switches is able to provide all the desired features while maintaining low complexity and low cost implementation.

Accordingly, there is a need for an improved asynchronous transfer mode packet switch that overcomes the limitations of the prior art.

OBJECTS AND SUMMARY OF THE INVENTION

In view of the limitations of prior art asynchronous transfer mode packet switches discussed above, it is an object of the present invention to provide an asynchronous transfer mode packet switch with an efficient and inexpensive architecture that is modular and expandable. It is also an object to provide an asynchronous transfer mode packet switch that incorporates priority sorting and improved multicasting while requiring a minimum amount of memory buffers.

More particularly, it is an object of the present invention to provide an asynchronous transfer mode packet switch that is expandable for use with applications with less than eight input and output devices to applications with as many as 16,384 input and output devices. Moreover, it is an object of the present invention to provide an asynchronous transfer mode packet switch that achieves this expandability using only a few modular interchangeable components.

It is another object of the present invention to provide an asynchronous transfer mode packet switch that is suitable for VLSI implementation due to its high degree of modularity.

It is another object of the present invention to provide an asynchronous transfer mode packet switch with completely shared memory buffers at the output stage of the switch to reduce the cost and complexity of the switch.

It is another object of the present invention to provide an asynchronous transfer mode packet switch that uses symmetric as well as asymmetric banyan routers and single-stage crossbar switches for more efficiently handling data packets destined for a plurality of output ports.

It is another object of the present invention to provide an asynchronous transfer mode packet switch that incorporates both multi-stage sorting and single-stage sorting of data packets to minimize the total number of sorting elements without reducing the speed of the switch.

It is another object of the present invention to provide an asynchronous transfer mode packet switch that uses non-symmetric sorters, expanders, and concentrators and that has a simple copy network for reducing the cost and complexity of the switch.

In view of these and other objects that become evident from the following detailed description of the preferred embodiments of the invention, an improved asynchronous transfer mode packet switch for routing data packets between a plurality of input and output devices is disclosed herein. The asynchronous transfer mode packet switch of the present invention provides a high degree of modularity by allowing expansion of the switch to handle applications having less than eight input and output devices to applications having up to $2^{14}$ input and output devices.

The preferred asynchronous transfer mode packet switch is constructed as either a single-stage switch for routing data packets between up to $2^6$ input and output devices, a two-stage switch for routing packets between up to $2^{10}$ input and output devices, or a three-stage switch for routing packets between up to $2^{14}$ input and output devices.

The single-stage asynchronous transfer packet switch of the present invention broadly includes a plurality of input port controllers, a plurality of output port controllers, and one or more output group modules. The single-stage asynchronous transfer packet switch can be used for routing data packets between eight or less input and output devices by using a single output group module and can be expanded for routing data packets between up to $2^6$ input and output devices by coupling as many as four output group modules together.

Each output group module is a 16×16 shared buffer switch that broadly includes a group of regular buffers, a group of overflow buffers, an input processing module, a memory module, an input to buffer switching module, a set of read sequencers, a buffer to port switching module, and a buffer management module.

The regular buffers store incoming data packets before routing to their respective output ports. The overflow buffers store incoming data packets when the regular buffers are full. The input processing module receives data packets from a plurality of input port controllers. The memory module stores the output port destination bit maps and the corresponding priority of multicast data packets. The input to buffer switching module switches data packets from the input processing module to the regular and overflow buffers. The set of dynamically prioritized read sequencers store and prioritize a read queue for each output port. The buffer to port switching module switches data packets from the regular and overflow buffer groups to their respective output ports. The buffer management module controls the allocation and release of the regular and overflow buffers, updates the read sequences, and triggers the buffer to port switching module.

The regular buffers and overflow buffers are advantageously grouped into a number of buffer groups equal to the number of input ports for facilitating quick transfer of data packets to the buffer groups. Additionally, each buffer group includes a plurality of memory buffers that are completely shared by all input and output ports.

By providing a single-stage asynchronous transfer packet switch in accordance with the above described construction, numerous advantages are realized. For example, by providing a single-stage asynchronous transfer packet switch with a highly modular architecture, the switch can be used in small networking applications and can be easily expanded to handle future growth by merely adding additional output group modules.

Additionally, by providing regular and overflow buffer groups each including multiple memory buffers, the switch operates like a switch with the same number of buffers as input ports, thus significantly simplifying routing into the buffers. Moreover, by providing multiple memory buffers in each buffer group that are completely shared by all of the input and output ports, data packet blocking within the switch can be reduced to an acceptable level or completely eliminated with a minimum number of buffers.

The two-stage asynchronous transfer mode packet switch of the present invention is most efficient for routing data packets between up to $2^{10}$ input and output devices and includes a plurality of input group modules, a broadcast and recirculation module and a plurality of output group modules identical to those described above.

Each input group module is an $n_i \times n_i$ switch that is combined with other input group modules to make up the input stage of the two-stage asynchronous transfer mode packet switch. The preferred two-stage asynchronous transfer mode packet switch includes 16 input group modules each routing data packets from 64 input devices.

Each input group module broadly includes a 64×64 concentrator, a plurality of demultiplexers, a 16×8 concentrator, a fan-out copy network, a delay module, a 128×128 sorter, a 128×128 trap network, a 128×128 concentrator, and three 32×64 banyan routers.

The 64×64 concentrator separates the incoming data packets according to the number of output ports to which the data packets are destined. The demultiplexers separate multicasting data packets from broadcasting data packets. The 16×8 concentrator concentrates the broadcast data packets and transmits them to the broadcast and recirculation module. The fan-out copy network duplicates multicast data packets and converts them into unicast data packets. The delay module delays unicast data packets before merging with the multicast data packets. The 128×128 sorter sorts data packets according to their priorities. The 128×128 trap network separates data packets that are to be routed from data packets that are to be recirculated. The 128×128 concentrator concentrates data packets that are to be routed and recirculates the other data packets to the broadcast and recirculation module. The three 32×64 banyan routers route the selected data packets to the output group modules for routing to the appropriate output devices.

The components of the preferred input group module cooperate for separating incoming data packets into unicast data packets destined for a single output port; multicast data packets destined for 2–8 output ports; and broadcast data packets destined for more than 8 output ports. The multicast data packets are copied in the fan-out copy network and merged with the unicast data packets and routed to the output group modules using the banyan routers. The broadcast data packets are pooled into the broadcast and recirculation module and are broadcast to all of the output group modules. The broadcast and recirculation module also include an appropriate number of recirculation paths from the input group modules to prevent data packet loss.

By providing a two-stage asynchronous transfer mode packet switch constructed as described above, numerous advantages are realized. For example, by providing an input group module that separates data packets that are destined to a plurality of outputs into two groups, the data packets destined for just a few output ports can be easily copied and converted into unicast data packets while data packets destined for a greater number of output ports can be broadcast to all output devices. This configuration allows the most efficient use of the switch's memory buffers and transfer paths.

Additionally, by providing a plurality of input group modules at the input stage of the switch that operate independently while completely sharing input buffers, the two-stage asynchronous transfer mode packet switch can handle a large number of data packets while preventing individual input group modules from becoming overloaded with data packets.

Further, by providing a broadcast and recirculation module that concentrates all broadcast data packets for routing to all of the output group modules and that concentrates all recirculated data packets for routing to all of the input group modules, the number of memory buffers required is significantly reduced without reducing the speed of the switch or creating blocking problems.

The three-stage asynchronous transfer mode packet switch of the present invention provides an additional switching stage for applications with more than $2^{10}$ input and output devices. The preferred three-stage asynchronous transfer mode packet switch broadly includes a plurality of input planes and a plurality of output planes.

Each input plane includes 16 input group modules and a broadcast and recirculation module that receive data packets from 1,024 input devices. The preferred three-stage asynchronous transfer mode packet switch includes 16 input planes.

The output planes are identical to the two-stage asynchronous transfer mode packet switch described above. Each output plane includes 16 input group modules, a broadcast and recirculation module, and 16 output group modules. Each output plane receives data packets from each input plane and routes the data packets to the output ports as described above.

By providing a three-stage asynchronous transfer mode packet switch in accordance with the above construction, the switch can be easily adapted to handle applications with a large number of input and output devices without the use of a plurality of different types of components.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
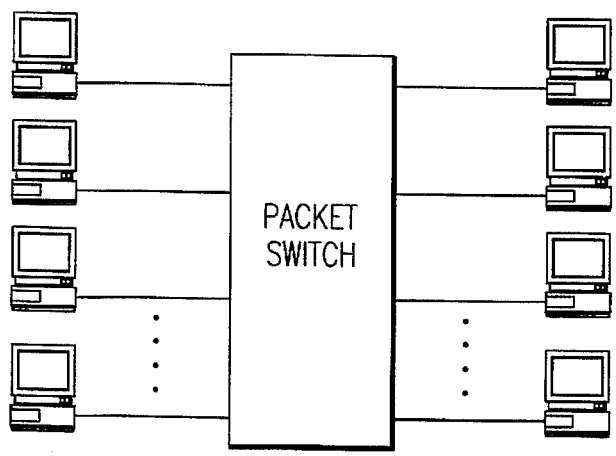
FIG. 1 is a block diagram of an asynchronous transfer mode packet switch coupled between a plurality of input and output devices for routing data packets therebetween.

Referring to the drawing figures, and particularly FIG. 1, an asynchronous transfer mode packet switch for routing data packets between a plurality of input and output devices such as computers is illustrated. The preferred asynchronous transfer mode packet switch is constructed as either a single-stage switch for routing packets between up to $2^6$ input and output devices, a two-stage switch for routing packets between up to $2^{10}$ input and output devices, or a three-stage switch for routing packets between up to $2^{14}$ input and output devices. Each of these switch architectures is described separately below.

I. Single-stage Asynchronous Transfer Mode Packet Switch

Figure 2:
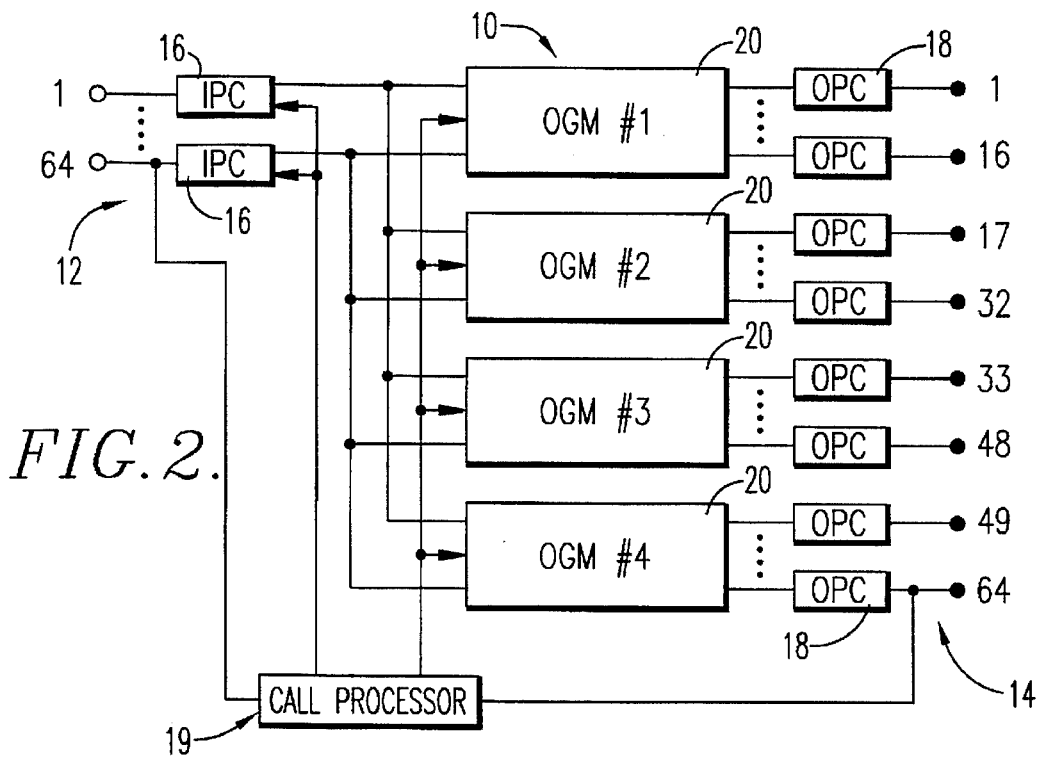
FIG. 2 is a block diagram of the components of a single-stage asynchronous transfer packet switch constructed in accordance with a preferred embodiment of the present invention.

Referring to FIG. 2, a single-stage asynchronous transfer mode packet switch 10 constructed in accordance with a preferred embodiment of the present invention is illustrated. The preferred single-stage asynchronous transfer packet switch 10 is operable for routing data packets between up to 64 input devices 12 and 64 output devices 14. For facilitating the description of a preferred embodiment of the invention, a 64×64 single-stage asynchronous transfer packet switch is described herein.

The preferred single-stage asynchronous transfer packet switch 10 broadly includes a plurality of input port controllers 16, a plurality of output port controllers 18, a call processor 19 and a number of identical output group modules 20. The input port controllers 16 receive data packets from input devices such as the computers illustrated in FIG. 1 and perform two primary input termination functions: data packet recovery, and header translation. The input port controllers 16 read the headers on the data packets, replace them with new headers, and attach routing tags for routing the packets through the single-stage asynchronous transfer packet switch. The input port controllers 16 then deliver the data packets containing the new routing tags to the inputs of the output group modules as described in more detail below. The input port controllers 16 may also perform data packet multiplexing or demultiplexing to support various data transfer speeds.

The output port controllers 18 receive data packets that have been routed through the output group modules 20 and deliver the data packets to a plurality of output devices 14 such as the computers illustrated in FIG. 1. The output port controllers 18 may also synchronize the timing of the data packets with their original transmission rate before transmitting the data packets to their respective output devices 14.

The call processor 19 is conventional and generally sets up and terminates calls. The call processor 19 also writes header translation information into the RAMs located in the input port controllers. The call processor 19 is responsible for: examining signaling cells; assigning virtual path identifier fields, virtual channel identifier fields, priority fields and broadcast channel numbers to new requests; sending signalling cells to the subscribers and/or other switching nodes for setting up or terminating calls; communicating with other switches/network management components as necessary; writing destination port bit maps and priority fields into RAMs in the output group modules for multicasting calls; and writing virtual path identifier/virtual channel identifier numbers in the RAMs located in the input port controllers.

The output group modules 20 basically are 16×16 shared buffer switches that each receive data packets from up to 64 input port controllers 12 for delivery to up to 16 output port controllers 18. The four output group modules 20 illustrated in FIG. 2 are dedicated through respective controls to the groups of output ports 1–16, 17–32, 33–48, and 49–64, respectively. As illustrated in FIG. 2, up to four output group modules 20 can be coupled together to form a single-stage asynchronous transfer packet switch 10 for switching data packets between up to 64 input and output devices. The components of each output group module cooperate for performing two basic steps: writing data packets into a group of buffers, and reading the data packets from the buffers.

Figure 5:
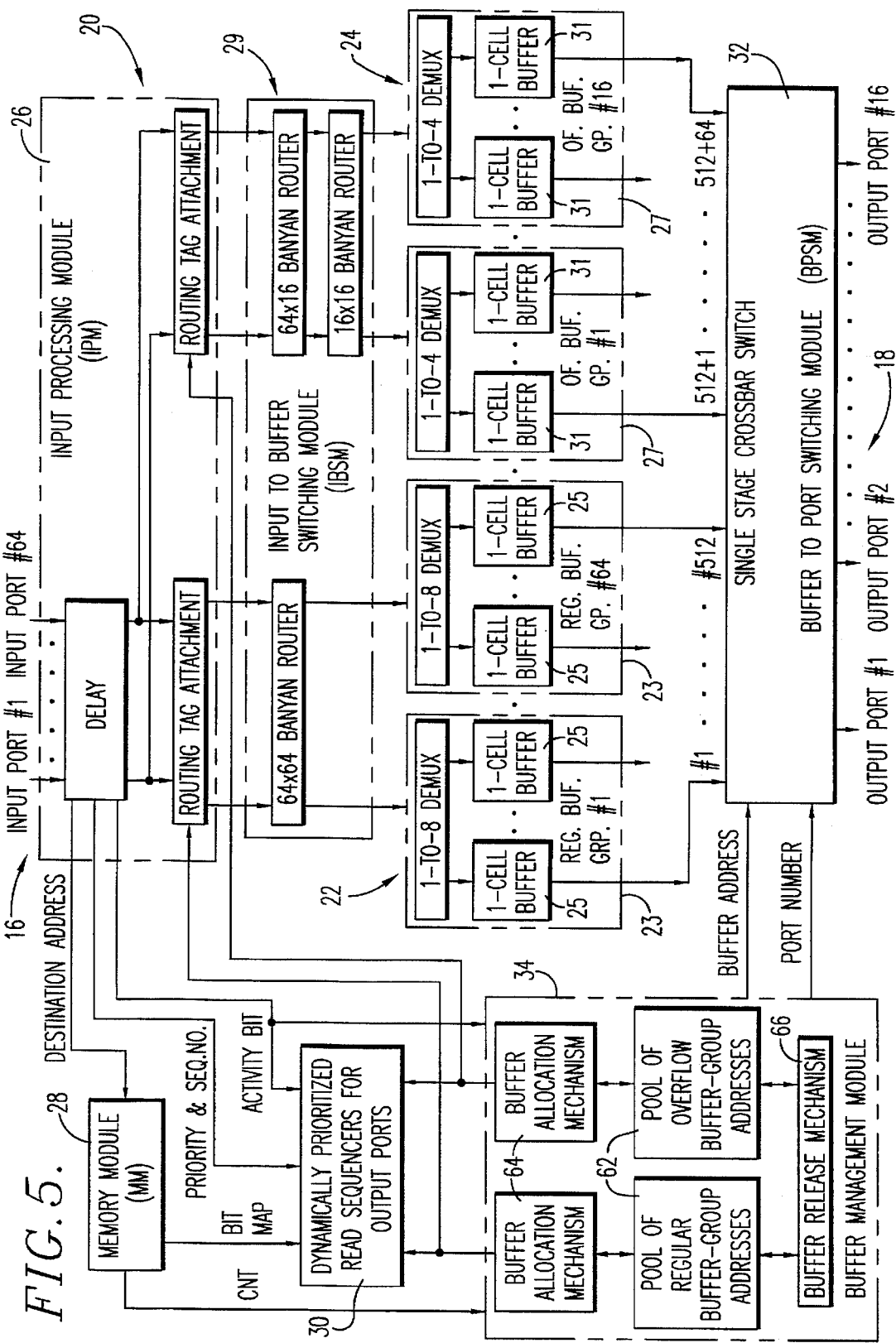
FIG. 5 is a block diagram of an output group module.

As illustrated in more detail in FIG. 5, each output group module 20 includes a group of regular buffers 22, a group of overflow buffers 24, an input processing module 26, a memory module 28, an input to buffer switching module 29, a set of dynamically prioritized read sequencers 30, a buffer to port switching module 32, and a buffer management module 34.

In general, the regular buffers 22 store incoming data packets before routing the packets to their respective output ports. The overflow buffers 24 store incoming data packets when the regular buffers 22 are full. The input processing module 26 receives data packets from a plurality of input port controllers. The memory module 28 stores the output port destination bit maps and the corresponding priority of multicast data packets. The input to buffer switching module 29 switches data packets from the input processing module to the regular and overflow buffers. The set of dynamically prioritized read sequencers 30 store and prioritize a read queue for each output port. The buffer to port switching module 32 switches data packets from the regular and overflow buffer groups to their respective output ports. The buffer management module 34 controls the allocation and release of the regular and overflow buffers, updates the read sequencers, and triggers the buffer to port switching module.

In more detail, the regular buffers 22 of the preferred output group module 20 includes a plurality of buffer groups 23 each having a plurality of individual buffers 25 for storing incoming data packets before the data packets are routed to the appropriate output ports. As those skilled in the art will appreciate, the routing of data packets into buffers is greatly simplified if the number of buffers equals the number of input ports. This is because using this design, multiple data packets need not be written into a single buffer in one clock period. However, if the number of buffers is limited to the number of input ports, the single-stage asynchronous transfer packet switch 10 experiences significant head-of-the-line blocking and a much larger buffer depth due to inefficient sharing by the output ports. This blocking results in switching delays and loss of priority among incoming data packets.

To minimize the memory requirements, reduce the time required for storing into buffers, and eliminate blocking problems, the regular memory buffers 22 of the present invention are organized so that the switch appears to have 64 buffers at the input side and 512 buffers at the output side of the switch. This is accomplished by dividing the regular buffers 22 into 64 buffer groups 23 each including eight individual buffers 25 as illustrated in FIG. 5. Incoming data packets are delivered to the buffer groups 23 sequentially so that each buffer group 23 only receives one data packet per clock cycle and the first available individual buffer 25 within each group receives a data packet during that clock cycle. This greatly simplifies routing since such a buffer allocation also satisfies conditions for a non-blocking banyan router without the requirement of a sorter. As described in more detail below, the buffer management module 34 organizes the allocation of data packets to the regular buffers 22.

The overflow memory buffers 24 are provided for storing incoming data packets when the regular memory buffers 22 are full. The overflow memory buffers 24 are also organized into a plurality of buffer groups 27 each containing individual buffers 31. It has been discovered that sixteen overflow buffer groups 27 each including four buffers 31 is adequate to prevent data packet loss in a 64×64 single-stage asynchronous transfer packet switch. The buffer management module 34 also allocates data packets to these overflow buffers 24 in a manner similar to the allocation of data packets to the regular buffer groups 22.

The input processing module 26 receives data packets from a plurality of input port controllers 16 and modifies their header information and routes the data packets to the input to buffer switching module 29. When four output group modules are coupled together to form a 64×64 single-stage asynchronous transfer mode packet switch, each input processing module 26 receives data packets from 64 input port controllers destined for 16 output ports.

The data packets are either unicast cells destined for a single output port or multicast cells destined for a plurality of output ports. Unicast cells include the following header:

|a||a_m||d_1d_2||P_1P_2||S_1 ... S_7||d_3d_4d_5d_6|

The "a" bit is an activity bit that indicates the presence of an asynchronous transfer mode packet. The "$a_m$" bit is a broadcast indicator bit that indicates whether a packet is a unicast or a multicast data packet. An "$a_m$" value of 0 indicates the presence of a unicast packet, whereas an "$a_m$" value of 1 indicates the presence of a broadcast packet. The "$d_1 \ldots d_6$" bits are a six-bit destination address number that indicates the address of the output port the data packet is destined for. The "$P_1P_2$" bits are a two-bit priority field that indicate the priority of the data packet. The "$S_1 \ldots S_7$" bits are a seven-bit sequence number field that is used to preserve the first-in-first-out sequence of a plurality of data packets routed by a two-stage or three-stage asynchronous transfer mode packet switch. "$S_1 \ldots S_7$" is set to 0000000 for the single-stage asynchronous transfer packet switch.

Broadcast cells include the following header:

|a||a_m||B_1 ... B_10||00000|

The "$B_1 \ldots B_{10}$" bits are a ten-bit broadcast channel number for obtaining output port bit maps for the plurality of output ports and their corresponding priorities. The remaining bits are set to zeros so that the length of the routing tag is the same as in the unicast data packets described above.

The input processing module 26 performs two primary functions. First, it receives data packets from the input port controllers 16 and introduces a time delay in the routing of the data packets for allowing the buffer management module 34 to allocate available buffers for the data packets. Second, it strips the routing tags from the data packets, transmits the routing tags to the buffer management module 34 for modification to routing tags, and receives and re-attaches the modified routing tags to the data packets for routing the data packets through the output group module 20. The preferred input processing module 26 is formed with either random access memory (RAM) devices or D-type flip-flops; however, it may be formed with other types of memory devices including FIFOs.

The memory module 28 receives the broadcast channel number from the routing tag of the data packets from the input processing module 26 to read the corresponding destination port bit map from the memory. This destination port bit map and priority bits portions of the data packet routing tag from the input processing module 26 are delivered to the buffer management module 34 and the dynamically prioritized read sequencers 30 as described in more detail below. The preferred memory module 28 is formed from conventional memory devices such as RAMs, D-type flip-flops, or FIFOs.

Figure 10:
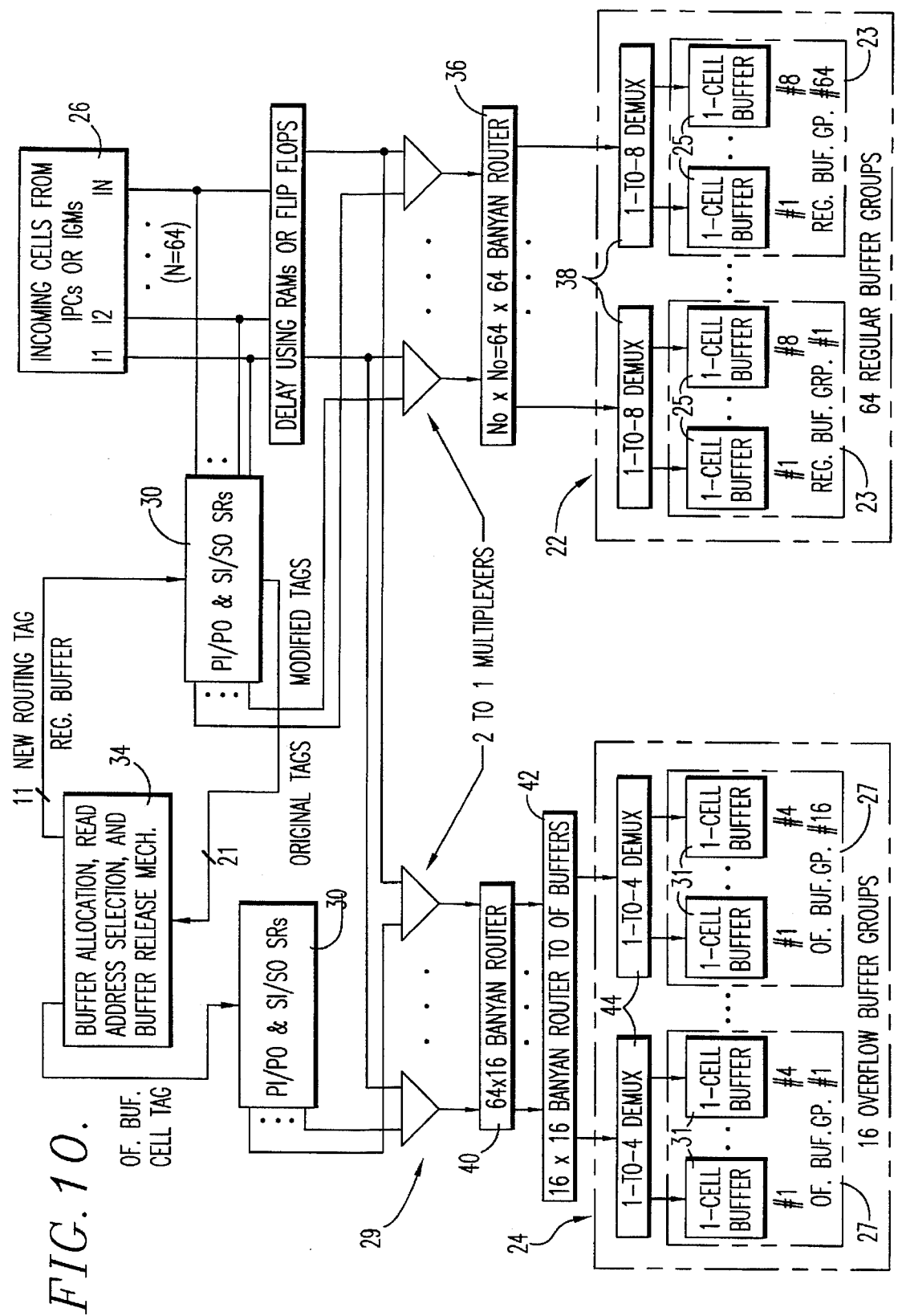
FIG. 10 is a block diagram of the output group module input to buffer switching module.

The input to buffer switching module 29 is coupled with the input processing module 26 for routing data packets to the regular and overflow buffers 22 and 24 after the input processing module 26 has attached new routing tags to the data packets. As illustrated in FIG. 10, the input to buffer switching module 29 includes a 64×64 banyan router 36 and 64 1×8 demultiplexers 38 for routing data packets to each of the 64 regular buffer groups. The 64×64 banyan router 36 receives the routing tags from the input processing module 26 and routes the data packets to one of the 64 regular buffer groups 23 based on the buffer group portion of the routing tags. The 1×8 demultiplexers 38 then route the data packets to the appropriate buffer 25 within the buffer group 23.

The input to buffer switching module 29 also includes a 64×16 banyan router 40, a 16×16 banyan router 42, and sixteen 1×4 demultiplexers 44 for routing data packets to each of the 16 overflow buffer groups 27. The 64×16 banyan router 40 receives the routing tags from the input processing module 26 when the regular buffers 22 are full and compacts the data packets to 16 lines for reducing the number of switching elements. The 16×16 banyan router 42 receives these compacted lines and routes the data packets to one of the 16 overflow buffer groups 27 based on the buffer group portion of the routing tag. The 1×4 demultiplexers 44 then route the data packets to the appropriate buffers 31 within the buffer groups 27.

Figure 8:
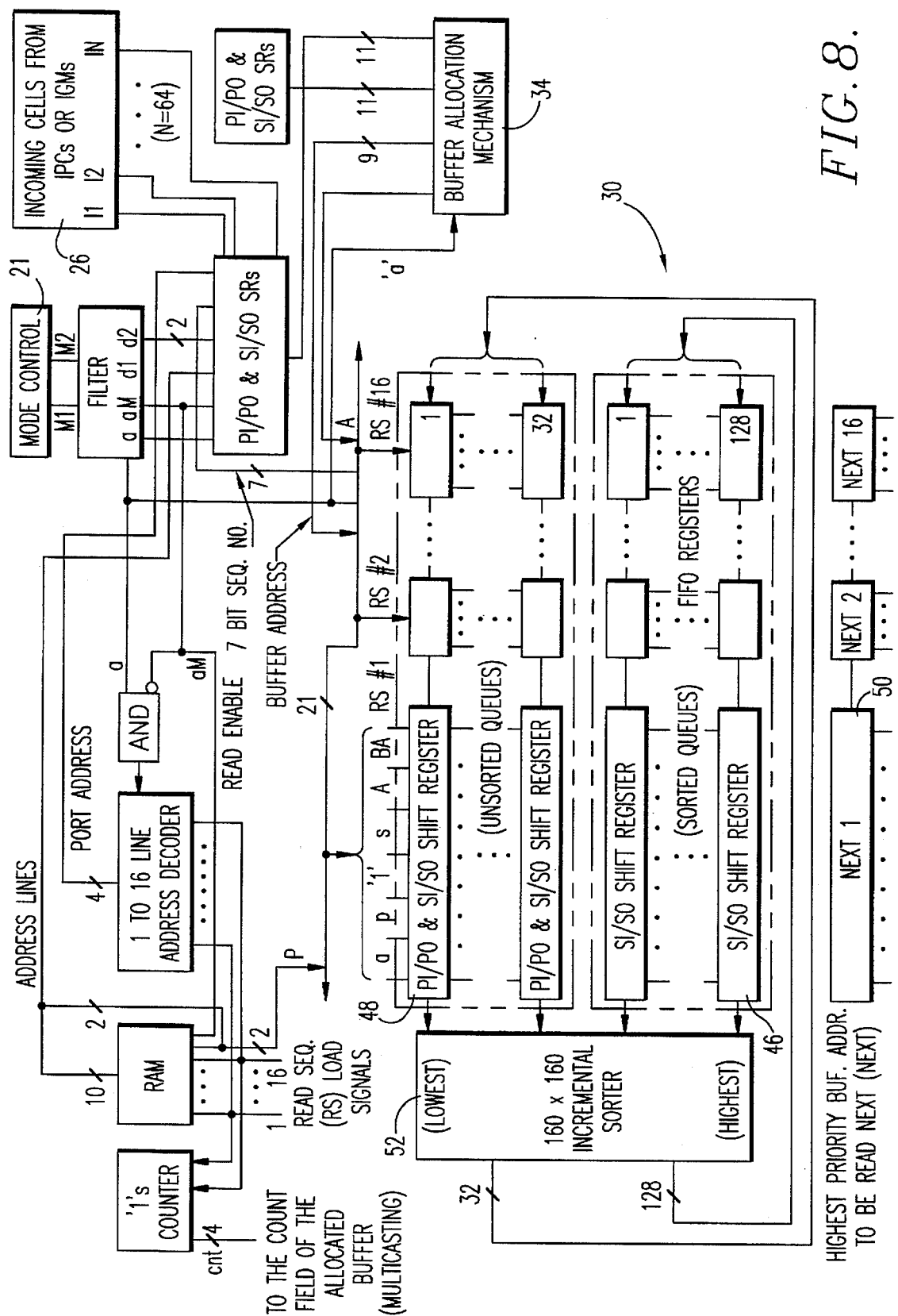
FIG. 8 is a block diagram illustrating the output group module dynamically prioritized read sequencers.

The dynamically prioritized read sequencers 30 are provided for storing and prioritizing read queues for each of the output ports coupled with the output group modules 20. The dynamically prioritized read sequencers 30 receive priority fields and sequence numbers from the routing tags of the data packets from the input processing module 26, the port bit map from the memory module 28, and buffer addresses from the buffer management module and use this information to create the read queues. As illustrated in more detail in FIG. 8, each dynamically prioritized read sequencer 30 preferably includes a group of 128 serial-in/serial-out shift registers 46, a group of 32 parallel-in/parallel-out and serial-in/serial-out shift registers 48, and a next register 50.

In general, the 128 serial-in/serial-out shift registers 46 store the buffer addresses, priority fields, and sequence numbers for data packets that have been sorted or prioritized. The 32 parallel-in/parallel-out and serial-in/serial-out shift registers 48 receive header information from new data packet arrivals that have not been sorted. The next registers 50 store the address of the highest priority buffer to be read next by the output ports.

In more detail, the serial-in/serial-out 46 and parallel-in/parallel-out 48 shift registers perform two primary functions. First, they select the highest priority buffer to be read next for their respective output port. Second, they sort the entire read queue during each time slot so that the dynamically prioritized read sequencers 30 are continually or dynamically prioritized. To select the highest priority buffer, the priority of a newly allocated buffer is compared with the priority of the buffer in the next register 50. The buffer with the higher priority is placed in the next register 50 and the other buffer is entered on the top of the parallel-in/parallel-out shift registers 48. After all newly allocated buffers have been compared with the buffer in the next register 50, the priority of the buffer in the next register 50 is compared with the priority of the buffer in the bottom-most sorted shift registers 46. If the buffer in the bottom-most register 46 has a higher priority, its contents are placed in the next register 50 and the contents of the next register 50 are transferred to the top of the unsorted shift register 48. At the end of this cycle, each next register 50 has the buffer address of the highest priority buffer to be read next by its corresponding output port.

Figure 9:
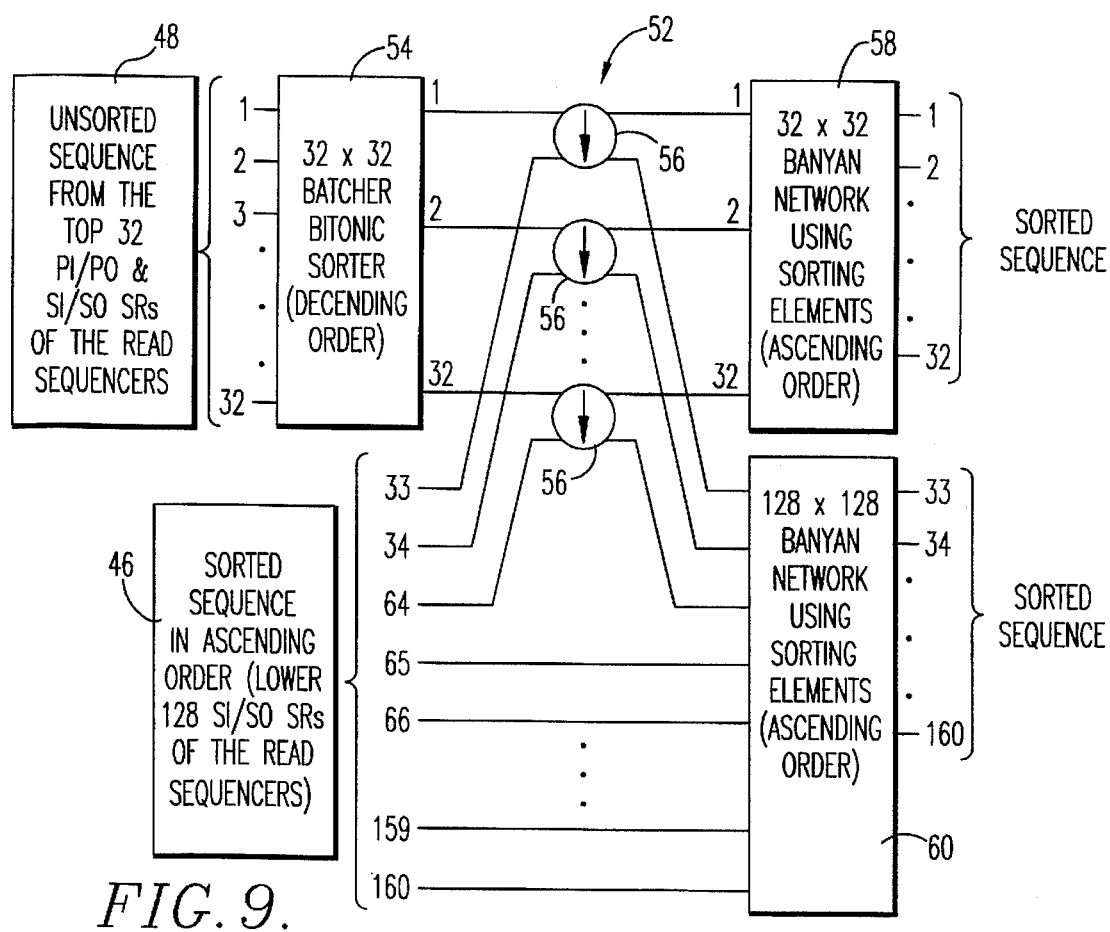
FIG. 9 is a block diagram of the output group module incremental sorter.

To sort the entire read queue during each time slot, an incremental sorter 52 is provided. The incremental sorter merges the sorted buffer addresses from the 128 serial-in/serial-out shift registers 46 with the unsorted buffer addresses from the 32 parallel-in/parallel-out and serial-in/serial-out shift registers 48. The incremental sorter 52 is illustrated in more detail in FIG. 9 and includes a 32×32 bitonic sorter 54, a plurality of 2×2 sorting elements 56, a 32×32 banyan router using sorting elements 58, and a 128×128 banyan router using sorting elements 60. The incremental sorter 52 offers great advantages over the prior art, because conventionally a 256×256 bitonic sorter with significantly greater complexity compared to the incremental sorter 52 was required to sort a 160 element list.

The 32×32 bitonic sorter 54 receives and sorts the unsorted buffer addresses from the 32 parallel-in/parallel-out and serial-in/serial-out shift registers 48 and sorted buffer addresses from the 128 serial-in/serial-out shift registers 46. The 2×2 sorting elements 56, the 32×32 banyan router 58 and the 128×128 banyan router 60 then cooperate to merge the two sorted lists from the 32×32 bitonic sorter 54 and 128 serial-in/serial-out shift registers 46 and sort the buffer addresses according to their activity bits, priority fields, and sequence numbers. The 32×32 banyan router 58 then delivers the 32 lowest priority buffer addresses to the unsorted 32 parallel-in/parallel-out serial-in/serial-out shift registers 48. Simultaneously, the 128×128 banyan router 60 delivers the 128 highest priority buffer addresses to the sorted 128 serial-in/serial-out shift registers 46.

Returning to FIG. 5, the buffer to port switching module 32 is coupled between the regular and overflow buffers 22 and 24 and the output ports 18 and is provided for switching data packets therebetween. The preferred buffer to port switching module 32 is a single-stage 576×16 crossbar switch. The use of a crossbar switch is advantageous because it allows multicasting from a single buffer without the use of a copy network. Additionally, a crossbar switch requires less control complexity due to its sequential control operation in this design and does not require speed-up since all output ports can read buffers simultaneously. Finally, the use of a crossbar switch allows the buffer-to-port switch module 32 to be expanded linearly if more buffers are added.

As illustrated in FIG. 5, the preferred buffer management module 34 broadly includes a pool of sequentially arranged buffer group addresses 62 with their corresponding group bit maps, a buffer allocation mechanism 64, and a buffer release mechanism 66 for both the regular and overflow buffers 22 and 24. In general, the buffer management module 34 manages the allocation and release of both the regular buffers 22 and the overflow buffers 24, updates the dynamically prioritized read sequencers 30 and generates buffering enable/disable and read/write signals.

The pool of sequentially arranged buffer group addresses 62 for the regular and overflow buffers are used to determine which buffers are available for allocation. The buffer allocation mechanism 64 reads buffer addresses from this pool 62 for allocating the buffers for incoming data packets. To reduce memory storage for the read queues, each group of buffers is represented by a single buffer address in the pool 62. The buffer address for the regular buffer groups is as follows:

!6-bit group number!!b$_o$,b$_1$, ... b$_7$!

The 6-bit group number identifies a particular buffer group within the 64 buffer groups 23. The "b$_o$,b$_1$, ... b$_7$" value represents the availability of the individual buffers 25 within the corresponding buffer group 23. For example, a "b0" value of 1 indicates that the first buffer in the buffer group is available for allocation.

Similarly, the buffer address for the overflow buffer groups is as follows:

4-bit group number!!b$_o$,b$_1$, ... b$_3$!

The 4-bit group number identifies a particular overflow buffer group within the 16 overflow buffer groups 27. The "b$_o$b$_1$, ... b$_3$" value represents the availability of an individual overflow buffer 31 within the overflow buffer group 27.

Figure 6:
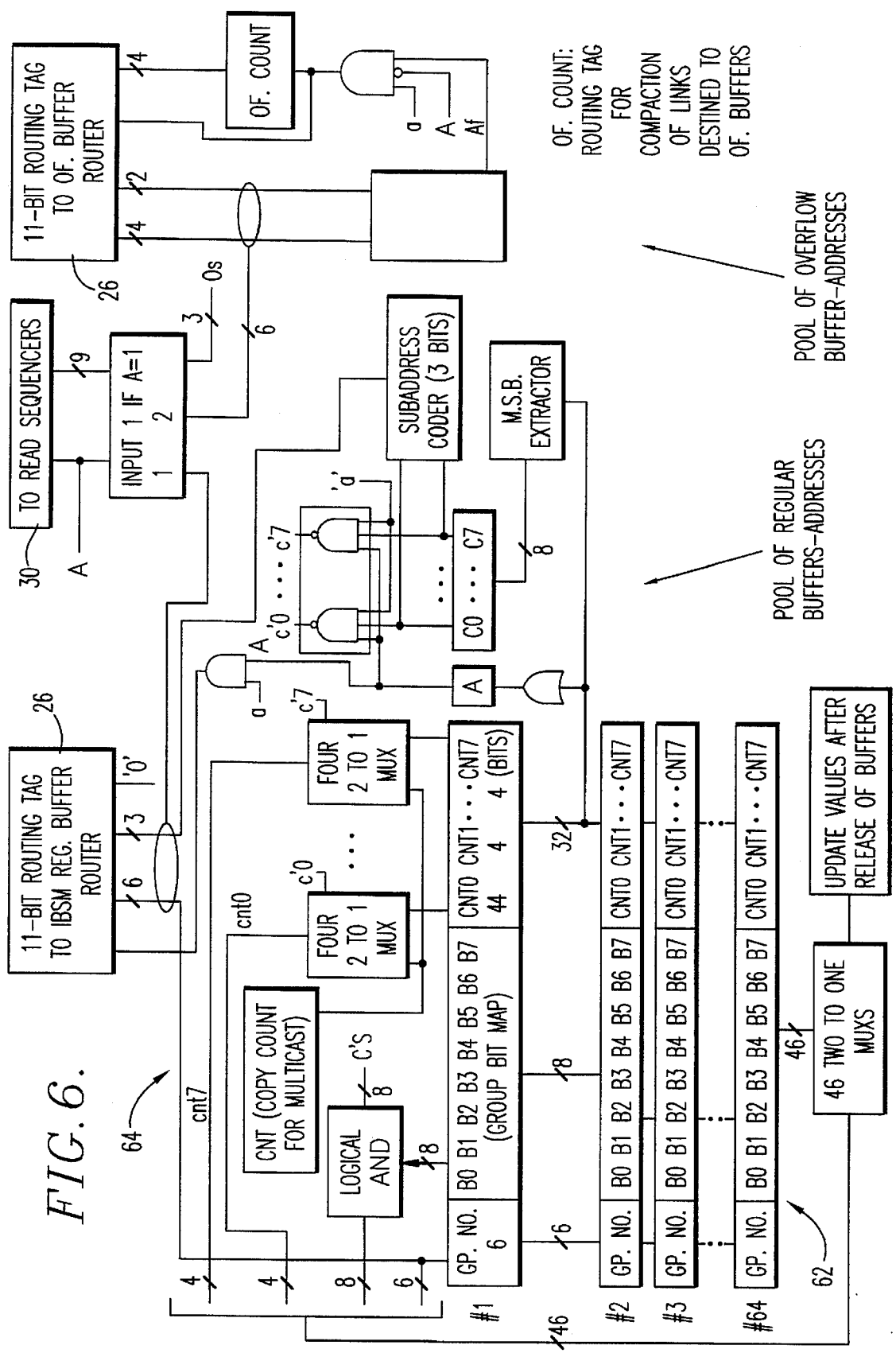
FIG. 6 is a block diagram illustrating the output group module buffer allocation mechanism.

The buffer allocation mechanism 64 and its operation are illustrated in more detail in FIG. 6. The buffer allocation mechanism 64 allocates a buffer address from the pool of empty buffers 62 for each incoming data packet by sending a routing tag to the input processing module 26 for attachment to an incoming data packet. The buffer allocation mechanism 64 generates an 11-bit routing tag including a 9-bit buffer address. The 9-bit buffer address includes a 6-bit group number for determining which of the 64 buffer groups 22 the data packet will be routed to and a 3-bit sub-address for determining which individual buffer 25 within the buffer group 23 receives the data packet.

The buffer allocation mechanism 64 allocates available buffers in a sequential manner by allocating the first available buffer from the first buffer group, then allocating the first available buffer from the next buffer group, and so on until one buffer from each of the 64 buffer groups has been allocated. With this configuration, the buffer allocation mechanism 64 allocates available buffers to incoming data packets in a manner that doesn't cause blocking in the input to buffer switching module 29. Additionally, the buffer allocation scheme allows the individual buffers 25 in all the buffer groups 23 to be completely shared by all output ports 18.

As illustrated in FIG. 6, the buffer allocation mechanism 64 takes no action if a link has no request for a buffer. A buffer must be allocated to a link if its activity bit a="1". In that case, the group bit map which is stored in the pool 62 on top of the regular buffer queue is examined. If at least one of the bits in the group bit map is "1" (indicating buffer availability), the buffer corresponding to the least most significant bit of the group bit map is allocated, the corresponding $b_k$ bit is changed to "0", the corresponding cnt$_k$ field is updated as per the new request, and the modified buffer address is placed at the bottom of the queue.

Simultaneously, this process is also done on the pool of overflow buffers. The allocation process for the overflow buffer groups is similar to that for the regular buffer groups except that the overflow buffers only have 16 buffer groups with four buffers for each group. If the regular buffer group is full, the buffer is taken from the overflow group. Otherwise, the overflow buffer group is left at its original place so that it is not placed at the bottom of the overflow queue.

If the regular as well as the overflow buffer groups are full, no buffer is allocated resulting in a cell loss. Then, both the group buffers are placed at the bottom of their respective queues.

After allocating a buffer for a data packet, the buffer allocation mechanism 64 enters the buffer address, priority field and the sequence number into the dynamically prioritized read sequencers 30. The buffer allocation mechanism 64 prepares a 10-bit field for updating the read sequencers as shown in FIG. 6.

Figure 7:
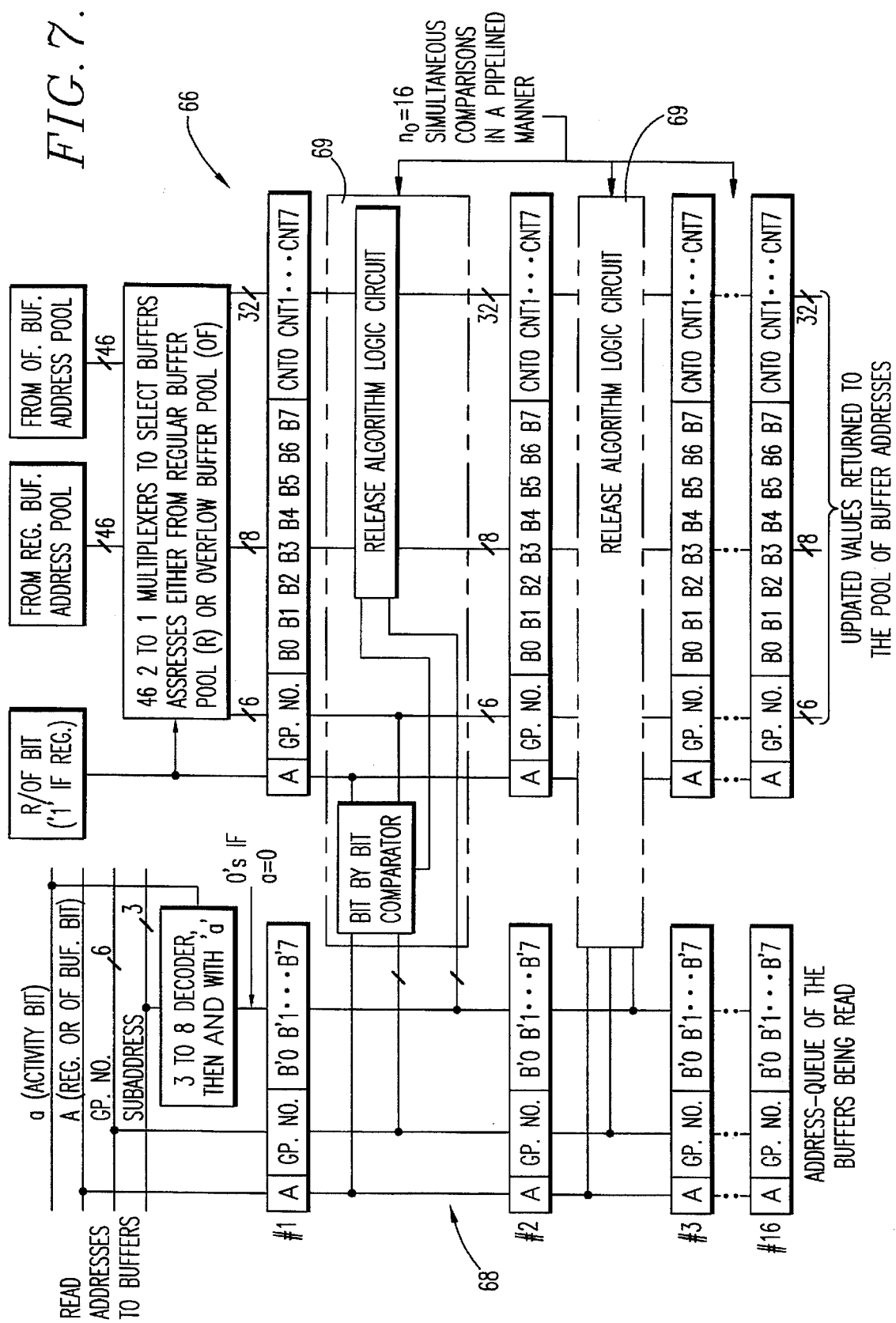
FIG. 7 is a block diagram illustrating the output group module buffer release mechanism.

The buffer release mechanism 66 and its operation are illustrated in FIG. 7. The buffer release mechanism 66 releases a buffer for reuse after the data packet in the buffer has been read by an output port. Since a broadcast data packet is stored in only one buffer but is read by more than one output port, the buffer must not be released until all of the output ports have read the buffer. To provide for this function, the buffer addresses stored in the pools of buffer addresses also include a count for indicating the number of destinations for a multicast data packet. This count is obtained from the destination port bit map provided by the memory module. The buffer management release mechanism 66 reduces the count by one each time an output port reads the buffer. Once the count reaches 0, the buffer can be released for the storage of a new data packet.

The buffers being read by the output ports are placed in a read buffer queue 68 including 16 registers. Each buffer address from the regular buffer pool and each buffer address for the overflow buffer pool is compared with each address in the read buffer queue 68 in a comparison circuit 69. If the two buffer addresses are the same, the buffer release mechanism 66 updates the buffer address stored in the pool by reducing the count by one and setting the b value to "1" if the count reaches 0. Setting the b value to "1" releases the buffer for reuse. If the count number does not equal 0, the buffer is not released since it has to be read by more output ports.

Figure 17A:
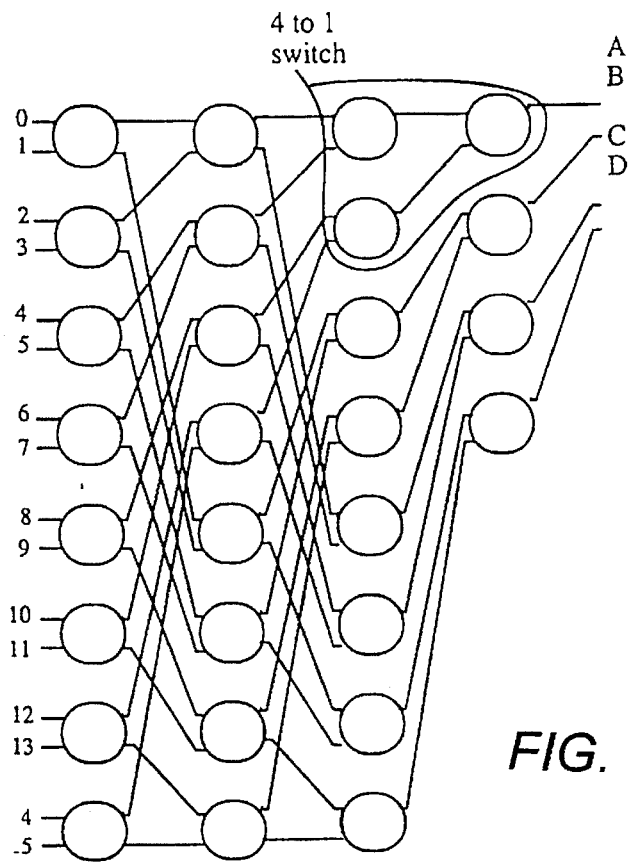
FIG. 17 is a block diagram illustrating a 16×4 concentrator utilizing a minimum number of 2×2 switches.
Figure 17B:
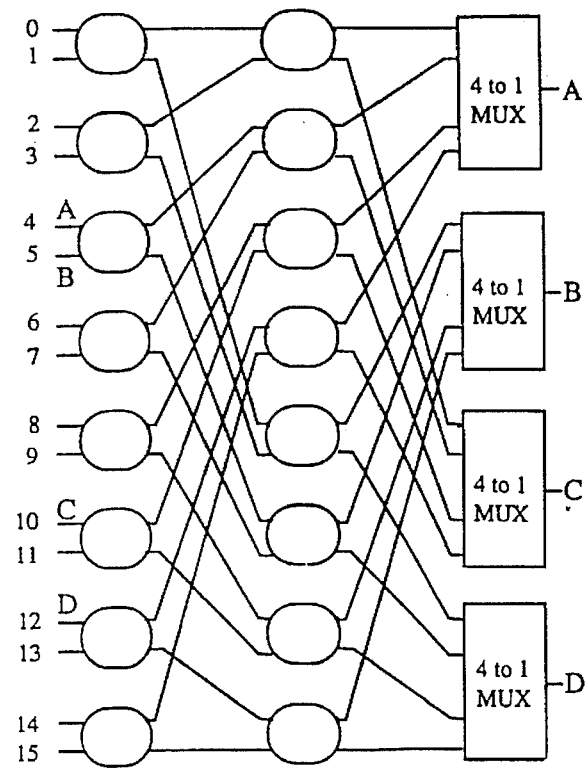
Figure 17C:
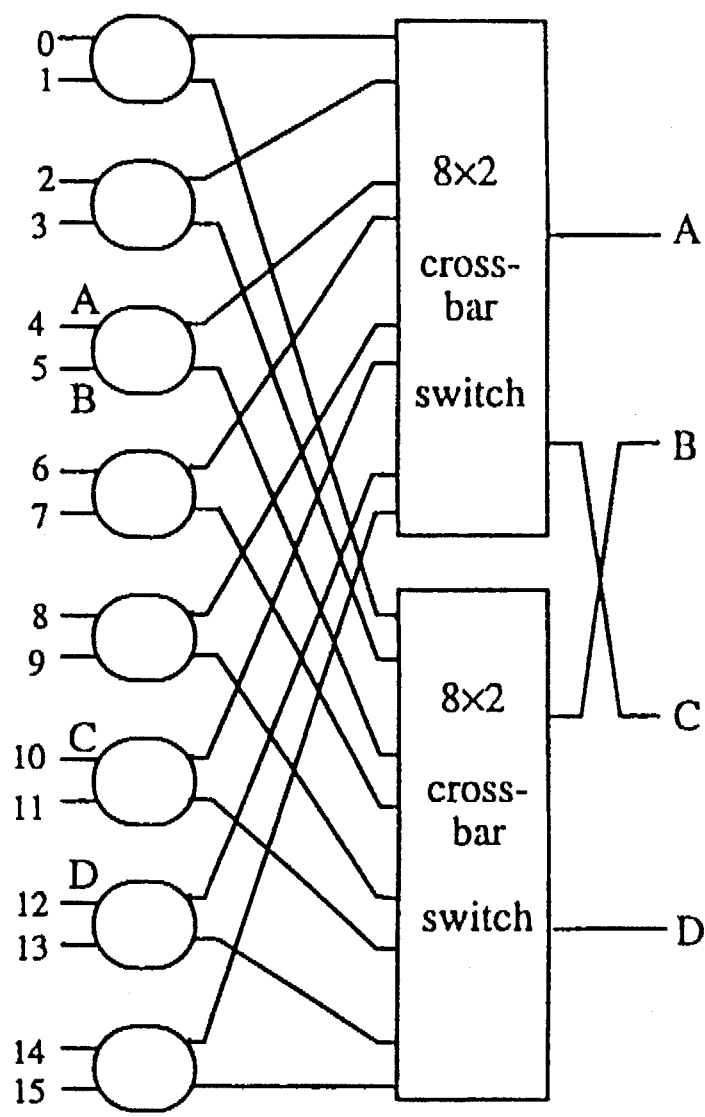

The asynchronous transfer mode packet switch of the present invention also uses non-symmetric concentrators and non-symmetric expanders. In many applications, non-symmetric concentration functions are required such as N input lines to M output lines, where N>M. Normally, N×N shuffle exchange or banyan routers requiring $N*n/2$ 2×2 switching elements have been used for symmetric as well as non-symmetric operations, where $N=2^n$ and $M=2^{n-i}$. It has been discovered that an N×N concentrator can be implemented using an equivalent of $N*(n-i)/2$ 2×2 switching elements as illustrated in FIG. 17 for a 16×4 concentrator. This is done by replacing the last $2^{i+1}$ stages of an N×N concentrator with a single stage of $M/2$ $2^{i+1}×2$ switching elements.

Similar to the nonsymmetric concentrators, M×N expandors can be implemented with $N=2^n$ and $M=2^{n-i}$ using an equivalent of $N*(n-i)/2$ 2×2 switching elements. In this case, the first (i+1) stages of the N×N expandor are replaced by a single stage of $M/2$ $2×2^{i+1}$ switches.

Operation of Single-Stage Asynchronous Transfer Mode Packet Switch

In operation, the single-stage asynchronous transfer packet switch 10 provides routing of data packets between up to 64 input and output devices. One output group module is used for each group of 16 output ports. The group number of an output group module is set by its mode control 21. As best illustrated in FIG. 5, data packets are initially received by the input processing module 26 and delayed to allow the buffer management module 34 time to allocate available buffers. Further processing of a data packet is rejected by the mode control 21 if the data packet is not destined to one of the ports of that output group module. The buffer management module 26 allocates available buffers and transmits new routing tags to the input processing module 26 for attachment to the data packets. The input processing module 25 then attaches these routing tags to the incoming data packets and delivers the data packets to the input to buffer switching module 29. The input to buffer switching module 29 switches the data packets to the allocated buffers in the regular 22 or overflow buffers 24. Simultaneously, the buffer management module 34 updates the dynamically prioritized read sequencers 30 for each of the output ports. The dynamically prioritized read sequencers 30 provide the address of the highest priority buffer which is to be read next by their respective output port. The buffer to port switching module 32 then routes the data packets from the buffers to the corresponding output ports.

II. Two-Stage Asynchronous Transfer Mode Packet Switch

The single-stage asynchronous transfer mode packet switch 10 described in Section I has an ideal switch architecture for applications with $2^6$ or less inputs and outputs. However, for applications having more than $2^6$ input and output devices, the single-stage asynchronous transfer packet switch 10 architecture becomes less efficient because of excessive buffer requirements, lengthy time delays needed for sequential processing, time delays due to the greater number of simultaneous read/write operations and increased complexity of internal switching. In view of these inefficiencies, multi-stage packet switches are generally advantageous for applications with more than $2^6$ input and output devices. In this section, a novel two-stage asynchronous transfer mode packet switch 100 is disclosed.

Figure 3:
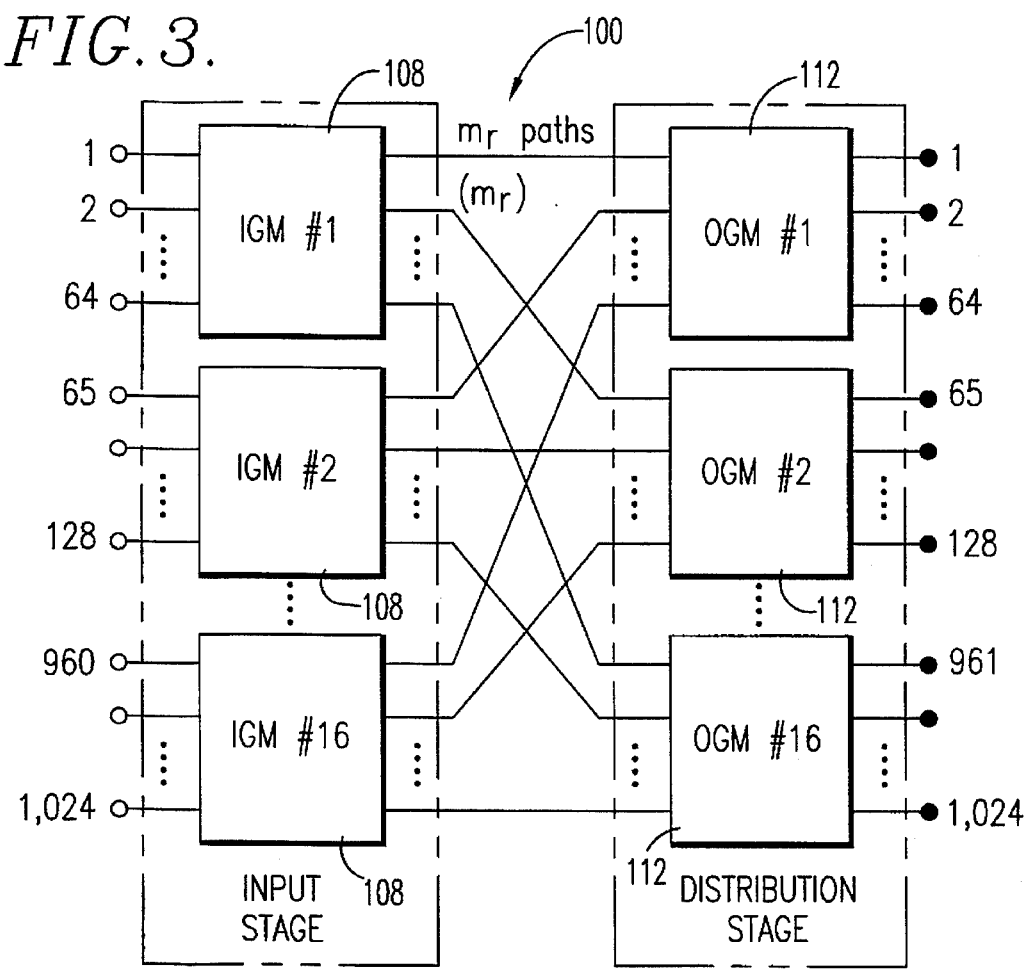
FIG. 3 is a block diagram of the components of two-stage asynchronous transfer mode packet switch constructed in accordance with a preferred embodiment of the present invention.

Referring to FIG. 3, a two-stage asynchronous transfer mode packet switch 100 constructed in accordance with a preferred embodiment of the present invention is illustrated. The preferred two-stage asynchronous transfer mode packet switch 100 is most efficient for routing data packets between $2^6-2^{10}$ input and output devices such as the computers illustrated in FIG. 1. For facilitating the description of a preferred embodiment of the invention, a $2^{10}×2^{10}$ or 1,024× 1,024 two-stage asynchronous transfer mode packet switch is disclosed and illustrated herein.

Figure 11:
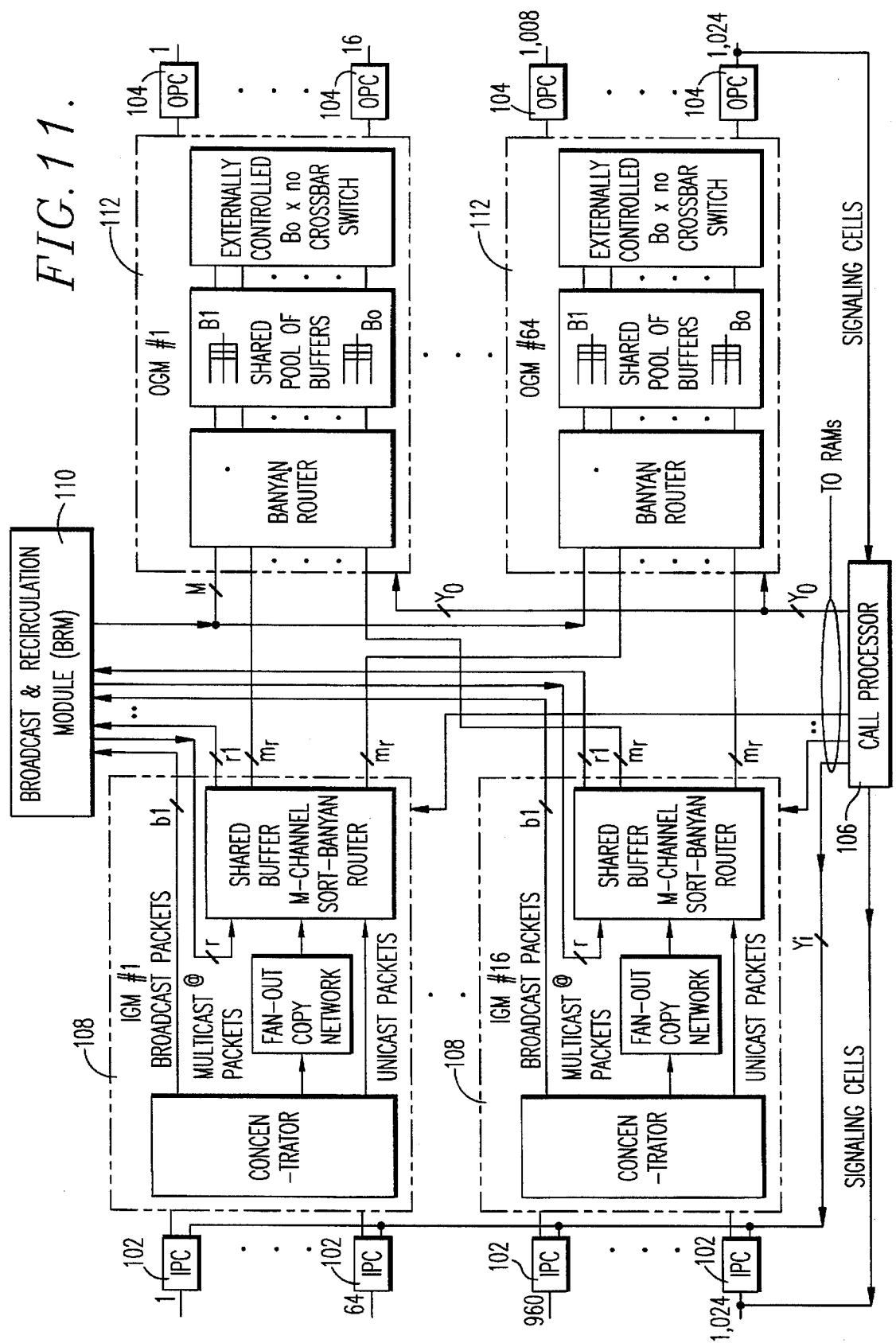
FIG. 11 is a block diagram illustrating the components of the two-stage asynchronous transfer mode packet switch in more detail.

As best illustrated in FIG. 11, the two-stage asynchronous transfer mode packet switch 100 broadly includes a plurality of input port controllers 102, a plurality of output port controllers 104, a call processor 106, a plurality of input group modules 108, a broadcast and recirculation module 110, and a plurality of output group modules 112.

The input port controllers 102, output port controllers 104, output group modules 112, and the call processor 106 are identical to those described in Section I and thus are not described in detail in this Section.

The input group modules 108 are $n_i×n_i$ switches that make up the input stage of the two-stage asynchronous transfer mode packet switch 100. $N/n_i$ total input group modules 108 are provided for forming an N×N two-stage asynchronous transfer mode packet switch 100. Each input group module 108 receives data packets from $n_i$ input port controllers 102 and routes the data packets to the output group modules 112 over $m_r$ transmission paths. For the preferred two-stage asynchronous transfer mode packet switch 100, each input group module 108 is a 3-channel, 64×64 switch that routes data packets to the output group modules 112 over three transmission paths. Thus, a total of 16 input group modules are coupled with 64 output group modules.

Figure 12:
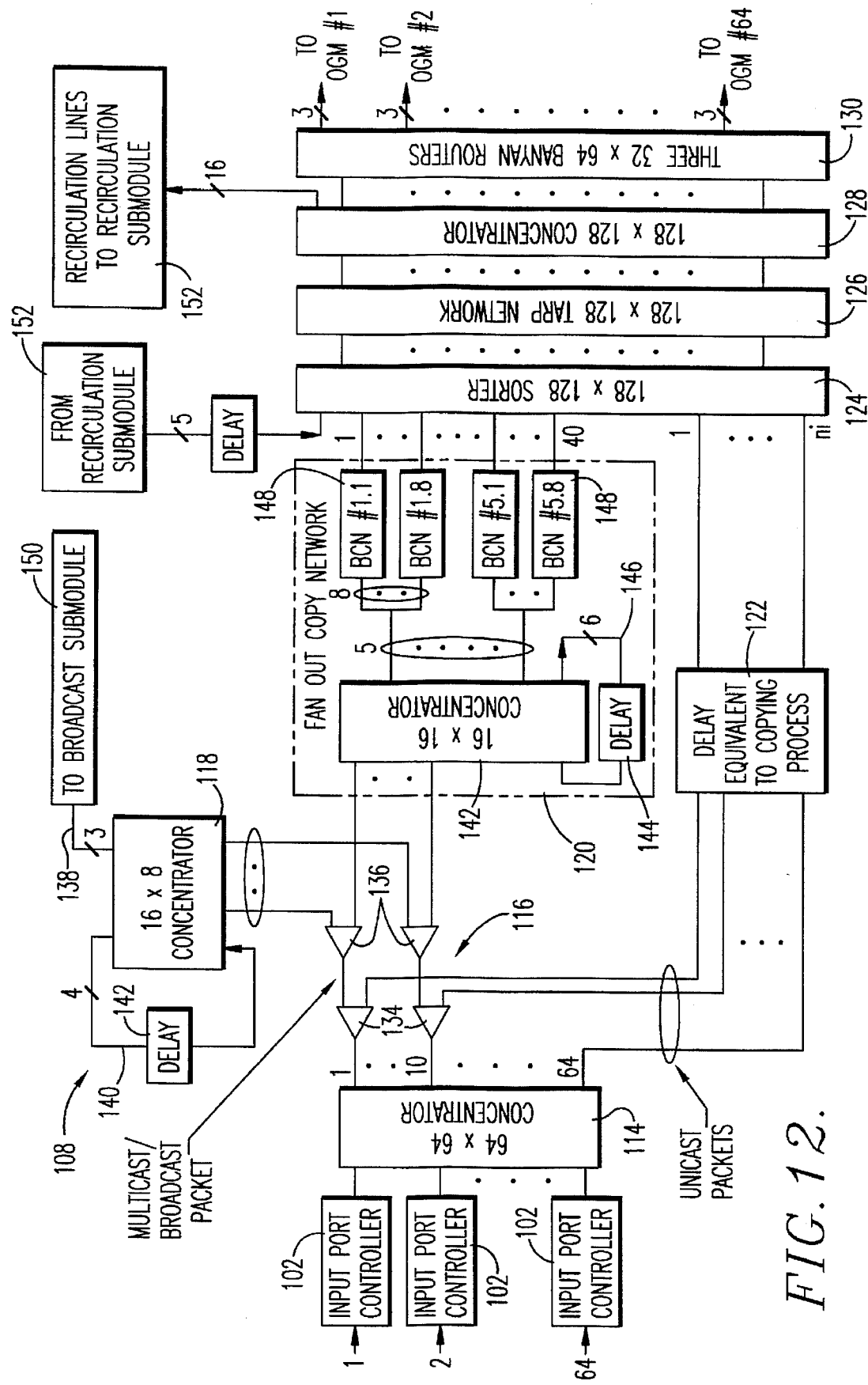
FIG. 12 is a block diagram of the two-stage asynchronous transfer mode packet switch input group module.

As illustrated in FIG. 12, each input group module 108 broadly includes a 64×64 concentrator 114, a plurality of demultiplexers 116, a 16×8 concentrator 118, a fan-out copy network 120, a delay module 122, a 128×128 sorter 124, a 128×128 trap network 126, a 128×128 concentrator 128, and three 32×64 banyan routers 130.

In general, the 64×64 concentrator 114 separates the incoming data packets into groups according to the number of output ports for which the data packets are destined. The demultiplexers 116 separate multicasting data packets from broadcasting data packets. The 16×8 concentrator 118 concentrates the broadcast data packets and transmits them to the broadcast and recirculation module 110. The fan-out copy network 120 duplicates multicast data packets and converts them into unicast data packets. The delay module 122 delays unicast data packets before merging them with multicast data packets. The 128×128 sorter 124 sorts data packets according to their priorities. The 128×128 trap network 126 separates data packets that are to be routed from data packets that are to be recirculated. The 128×128 concentrator 128 concentrates data packets that are to be routed and recirculates the other data packets to the broadcast and recirculation module 110. The three 32×64 banyan routers 130 route the selected data packets to the output group modules 112 for routing to the appropriate output devices.

In more detail, the 64×64 concentrator 114 receives data packets from the input port controllers 102 and separate them into three groups. The data packets may be destined for a single or a plurality of output ports. The two-stage asynchronous transfer mode packet switch 100 of the present invention takes a novel approach to multicasting data packets by dividing data packets into three groups. Data packets that are destined for a single output port are treated conventionally as unicast data packets. Data packets that are destined for more than one but less than "cp" destinations are called multicast data packets. Data packets that are destined for more than "cp" destinations are called broadcast packets. In the preferred embodiment of the invention, "cp" is 8.

Figure 14:
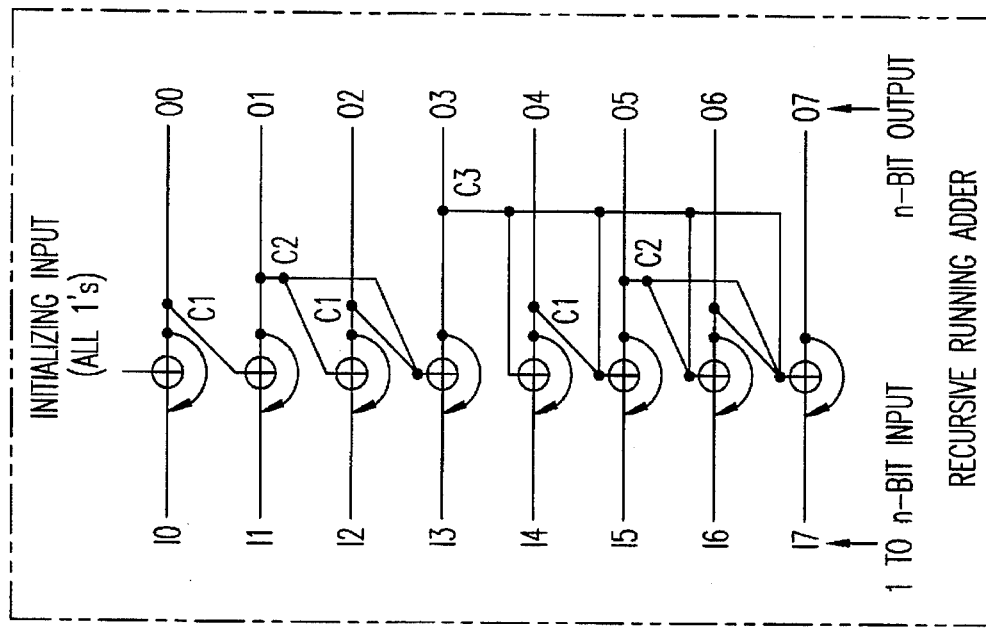
FIG. 14 is a block diagram illustrating the input group module recursive running adder.

The 64×64 concentrator 114 first separates the unicast data packets and inactive lines from the broadcast and multicast data packets and concentrates the data packets into these separate groups. To perform this separation, the 64×64 concentrator 114 includes a recursive running adder 132 (illustrated in FIG. 14 for 8 inputs) and a banyan router (not shown). The recursive running adder 132 assigns a routing tag to each incoming data packet. To concentrate the active links, the recursive running adder 132 must assign routing tags sequentially such that the tag of the first active link is 0, the routing tag of the second active link is 1, etc. These routing tags are generated by adding the activity bits of the active links. The recursive running adder similar to the one illustrated in FIG. 14 requires only 64 6-bit adders for accomplishing this function. Conventional running adders that are used for this function require n/2 times more hardware than the recursive running adder 132 for N inputs, where $N=2^n$. Returning to FIG. 12, the banyan router then sends the unicast data packets to the delay module 122 and sends the multicast and broadcast data packets to the demultiplexers 116.

The demultiplexers 116 separate the multicast data packets from the broadcast data packets. At multicast and broadcast loads on the switch 100 of about 1%, the number of multicast and broadcast data packets received by an input group module is typically below 10. Therefore, as illustrated in FIG. 12, the 10 outputs of the 64×64 concentrator having data packets with the greatest number of destinations are routed to a first set of demultiplexers 134. This first set of demultiplexers routes these data packets to the delay network 122 if their broadcast indicator bit in their routing tag equals "0" and to the second set of demultiplexers 136 if their broadcast indicator bit in their routing tags equals 1. Thus, the first set of demultiplexers 134 separate unicast data packets that were not separated by the 64×64 concentrator 114 from the multicast and broadcast data packets. The second set of demultiplexers 136 then separates the multicast data packets from the broadcast data packets and sends the multicast data packets to the fan-out copy network 120 and sends the broadcast data packets to the 16×8 concentrator 118 as discussed below.

The 16×8 concentrator 118 receives the broadcast data packets from the second set of demultiplexers 136 and concentrates these data packets into a number of broadcast lines 138 for delivery to the broadcast and recirculation module 110. The 16×8 concentrator 118 includes a running adder and a banyan router similar to those described for the 64×64 concentrator above. The 16×8 concentrator also includes a number of recirculation lines 140 and a delay network 142 for recirculating broadcast data packets that cannot be immediately transmitted by the broadcast links 138. The number of required broadcast lines 138 and recirculation lines 140 is determined by considering the number of broadcast data packets that are typically received at each input group module 108. In the preferred embodiment, 3 broadcast and 4 recirculation lines are provided.

The fan-out copy network 120 converts the multicast data packets into a plurality of unicast data packets. As illustrated in FIG. 12, the fan-out copy network 120 includes a 16×16 concentrator 142, a delay network 144, a number of recirculation lines 146, and a plurality of broadcast channel number translators 148.

The 16×16 concentrator 142 concentrates the multicast data packets into a number of multicast lines for delivery to the copying process. The duplications is done using a novel fan-out copy approach. In this approach, a line to be duplicated is simply fanned-out into as many lines as the number of copies desired. Thus, no special copy network is required. As illustrated, the preferred number of multicast data packets to be duplicated is up to five multicast data packets per time slot. The recirculation lines 146 and the delay network 144 recirculate multicast data packets that cannot be accommodated by the five duplication lines. The preferred fan-out copy network 120 includes six recirculation lines 146.

Since each multicast data packet can be destined for up to eight output ports in the preferred embodiment, each of the first five output links of the 16×16 concentrator 142 is fanned-out into 8 lines, and then each fanned-out line is connected to a broadcast channel number translator 148. The broadcast channel number translator 148 replaces the broadcast number in the routing tag of the multicast data packet with the address of the output port destination. Each broadcast channel number translator 148 has a RAM memory to store only one destination address per broadcast channel number. The first broadcast channel number translator 148 stores the first destination number, the second broadcast channel number translator stores the second destination number, etc. The broadcast channel number translation process converts the multicast data packets into unicast data packets. The broadcast channel number translators 148 deliver the converted unicast data packets to the 128×128 sorter 124. The fan-out copy network, therefore, requires no copy network or duplication, provides overflow protection, and requires minimum memory. Further, it allows multicast calls in each input group module 108 to be assigned destination addresses independently, thus increasing the capacity of the two-stage asynchronous transfer mode packet switch 100 when handling multicast data packets.

The delay module 122 receives unicast data packets from the 64×64 concentrator 114 and the first set of demultiplexers 134 and delays these unicast data packets while the multicast data packets are being converted to unicast data packet in the fan-out copy network 120.

The 128×128 sorter 124 merges the unicast data packets from the delay module 122 and the recirculated data packets from the recirculation submodule 152 with the multicast data packets that have been converted into unicast data packets by the fan-out copy network 120. The 128×128 sorter 124 then sorts all of the data packets according to their priorities. The sorter uses the routing tag bits $|d_1, d_2 \ldots d_x|P_1 \ldots P_p|S1 \ldots S_s|$ in the headers of the data packets for placing the data packets in ascending order according to their priorities. Data packets destined for the same output group module are placed on consecutive lines, with the highest priority data packets on top of that group. Similarly, the oldest data packets within a similar priority group are placed on top of the priority group. Since sorting is based on output group module addresses, all destinations within an output group module are treated with equal preference.

The 128×128 trap network 126 receives the sorted output of the 128×128 sorter 124 and selects which data packets are to be routed and which are to be recirculated. As discussed above, each input group module 108 preferably has only three output links connected to each output group module 112. Accordingly, the 128×128 trap network 126 selects three data packets per output group module per clock cycle for routing and marks the remaining data packets for recirculation. To accomplish this, the 128×128 trap network 126 introduces a trap bit "$TB_k$" to the data packet routing label. If $TB_k$ equals 1, the data packet is routed; conversely, if $TB_k$ equals 0, the data packet is recirculated.

The 128×128 concentrator 128 receives the data packets from the 128×128 trap network 126 and generates a new routing tag which includes the trap bit $TB_k$ generated by the 128×128 trap network 126. The 128×128 concentrator 128 then concentrates all the data packets to be routed during each cycle and recirculates the remaining data packets to the broadcast and recirculation module 110 as described in more detail below. The 128×128 concentrator 128 also strips the trap bit from the routing label before routing the data packets.

The 32×64 banyan routers 130 receive the data packets that have been selected for routing by the 128×128 concentrator 128 and route these data packets to the appropriate output group modules 112. Since the number of paths from each input group module to each output group module is three in the preferred embodiment, three 32×64 banyan routers 130 are required for each input group module 108.

Figure 13:
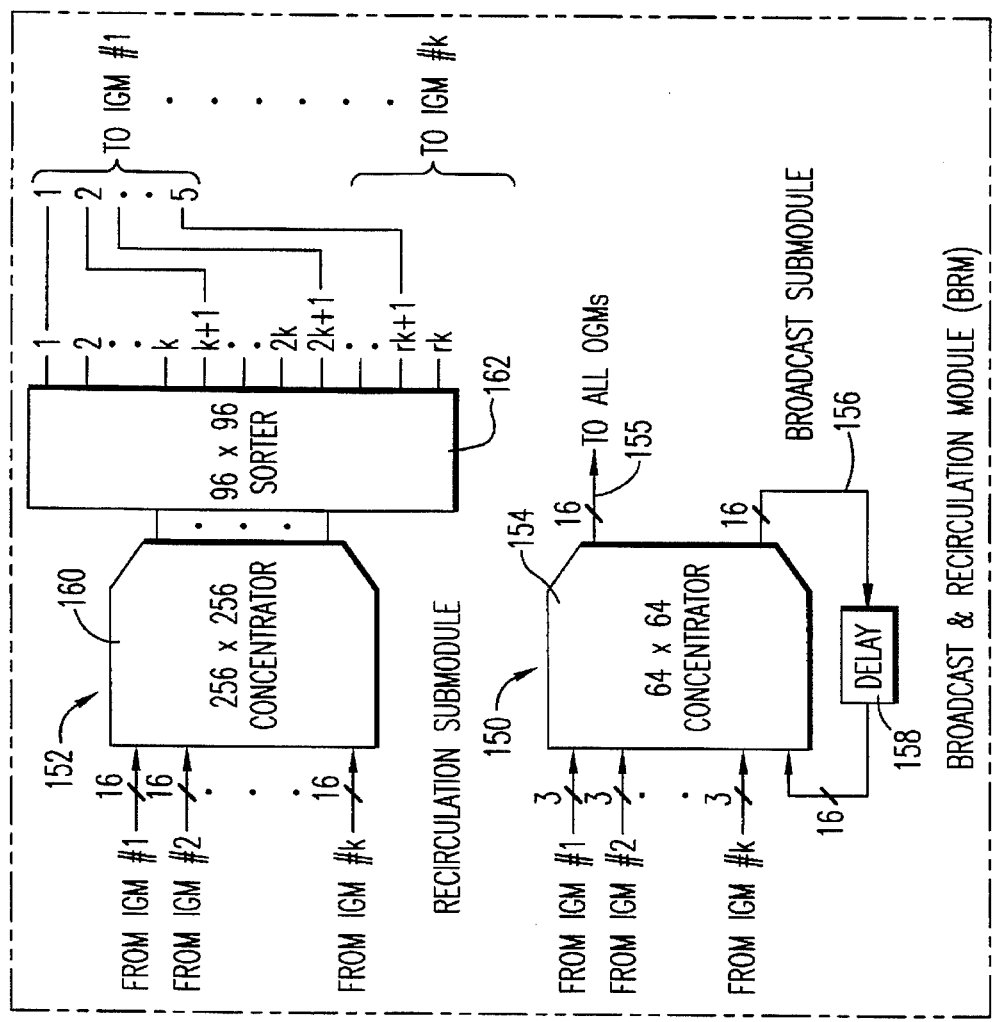
FIG. 13 is a block diagram of a broadcast and recirculation module.

The preferred broadcast and recirculation module 110 is illustrated in FIG. 13 and broadly includes a broadcast submodule 150 and a recirculation submodule 152. In general, the broadcast and recirculation module 110 broadcasts the broadcast data packets to all of the output group modules 112 and concentrates the unicast data packets that are not selected for routing during a clock cycle. After concentrating the unicast data packets, the broadcast and recirculation module redistributes the data packets cyclically to the sorters 124 in input group modules 108.

The broadcast submodule 150 includes a 64×64 concentrator 154, a number of broadcast lines 156, and a delay network 158. The 64×64 concentrator 154 receives the three broadcast data packets selected for routing by the 16×8 concentrators 118 from each input group module 108. The 64×64 concentrator 154 concentrates these data packets into a number of broadcast links 155 and broadcasts the highest priority data packets over these links to all output group modules 112. The data packets are prioritized according to the amount of time they have been in the broadcast and recirculation module 110. The preferred broadcast submodule includes 16 broadcast links. The recirculation lines 156 and the delay network 158 recirculate broadcast data packets of lower priority while the higher priority data packets are being routed. The preferred broadcast submodule includes 16 recirculation lines.

The recirculation submodule 152 includes a 256×256 concentrator 160 and a 96×96 sorter 162. The 256×256 concentrator 160 receives the 16 recirculation lines from the 128×128 concentrator 128 of each input group module 108. The 256×256 concentrator 160 concentrates all of these recirculation lines and delivers the lines to the 96×96 sorter 162. The 96×96 sorter 162 then sorts and prioritizes the recirculated data packets and transmits five of the recirculated data packets to each input group module 108. Also, new sequence numbers are assigned to the data packets at the output of the 96×96 sorter 102 so that the recirculated data packets receive a high priority in the input group modules.

The concentration of the recirculation lines from all of the input group modules 108 in the recirculation submodule 152 allows the number of buffers in the switch 100 to be significantly reduced. Additionally, since the number of incoming recirculation lines into each input group module 108 is reduced from 16 to 5, an input group module 108 experiencing a heavy traffic flow can be relieved of some of its traffic since its recirculated data packets are shared by all of the input group modules 108 rather than all being recirculated back to its own input. Thus, the recirculation submodule 152 enables the switch 100 to handle bursty input traffic effectively.

Operation of A Two-Stage Asynchronous Transfer Mode Packet Switch

In operation, the two-stage asynchronous transfer mode packet switch 100 provides routing of data packets between up to 1,024 input and output sources such as the computers illustrated in FIG. 1. As illustrated in FIG. 12, each preferred input group module 108 receives data packets from 64 input port controllers 102. The 64×64 concentrator 114 initially separates the unicast and inactive links from the multicast and broadcast links. Next, the demultiplexers 116 separate the multicast data packets from the broadcast data packets and deliver the broadcast data packets to the 16×8 concentrator 118 for routing to the broadcast and recirculation module 110 and deliver the multicast data packets to the fan-out copy network 120. The fan-out copy network 120 converts the multicast data packets into unicast data packets. The 128×128 sorter 124 merges the newly created unicast packets with the original unicast packets and packets from the recirculation submodule 152. The 128×128 trap network 126, the 128×128 concentrator 128, and the three 32×64 banyan routers 130 cooperate for either routing the unicast data packets to the output group modules 112 or for delivering the recirculated data packets to the broadcast and recirculation module 110. Finally, the broadcast and recirculation module 110 concentrates the broadcast data packets and routes them to all of the output group modules 112 and concentrates and sorts the recirculated data packets and redistributes them to all of the input group modules 108 cyclically.

IV. Three-Stage Asynchronous Transfer Mode Packet Switch

Figure 4:
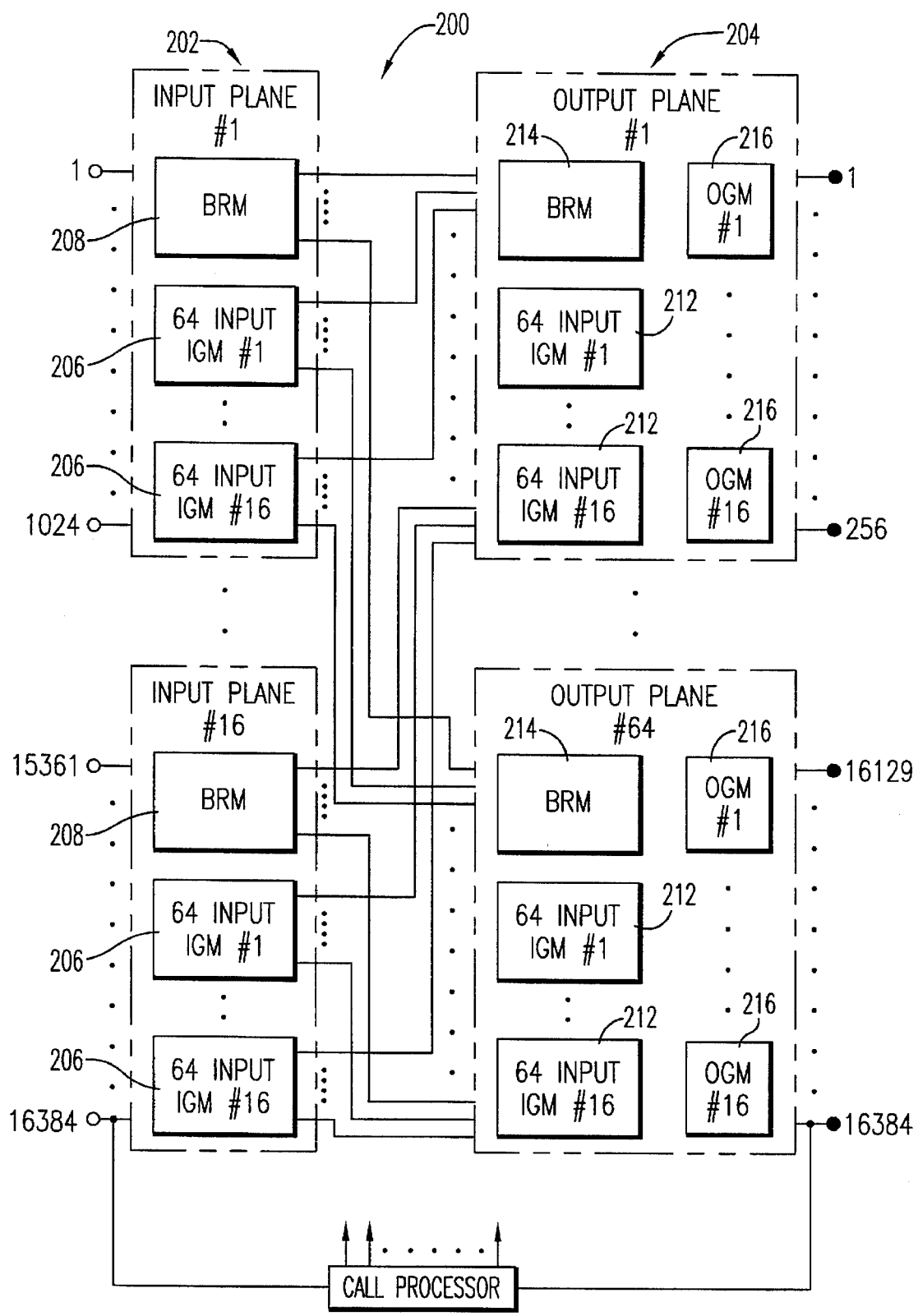
FIG. 4 is a block diagram of the components of a three-stage asynchronous transfer mode packet switch constructed in accordance with a preferred embodiment of the present invention.

For applications having more than $2^{10}$ inputs and outputs, it is necessary to provide an additional switching stage so that the same input group modules 108, output group modules 112, and broadcast and recirculation modules 110 as described in Section III of this application can be used. Referring to FIG. 4, a three-stage asynchronous transfer mode packet switch 200 constructed in accordance with a preferred embodiment of the present invention is illustrated. The preferred three-stage asynchronous transfer mode packet switch 200 broadly includes a plurality of input planes 202 and a plurality of output planes 204.

Each input plane 202 broadly includes 16 input group modules 206 and a broadcast and recirculation module 208. Each input group module receives data packets from 64 input port controllers (not shown) and routes the data packets to each of the output planes. In the preferred embodiment, the three-stage asynchronous transfer mode packet switch 200 includes 16 input planes each receiving data packets from $2^{10}$ input port controllers.

The output planes 204 are identical to the two-stage asynchronous transfer mode packet switch 100 described in Section II with only 16 output group modules. Each output plane 204 broadly includes 16 input group modules 212, a broadcast and recirculation module 214, and 16 output group modules 216. Each output plane receives data packets from each input plane and routes the data packets to the output ports as described in Section II.

Alternate Embodiments

Figure 16A:
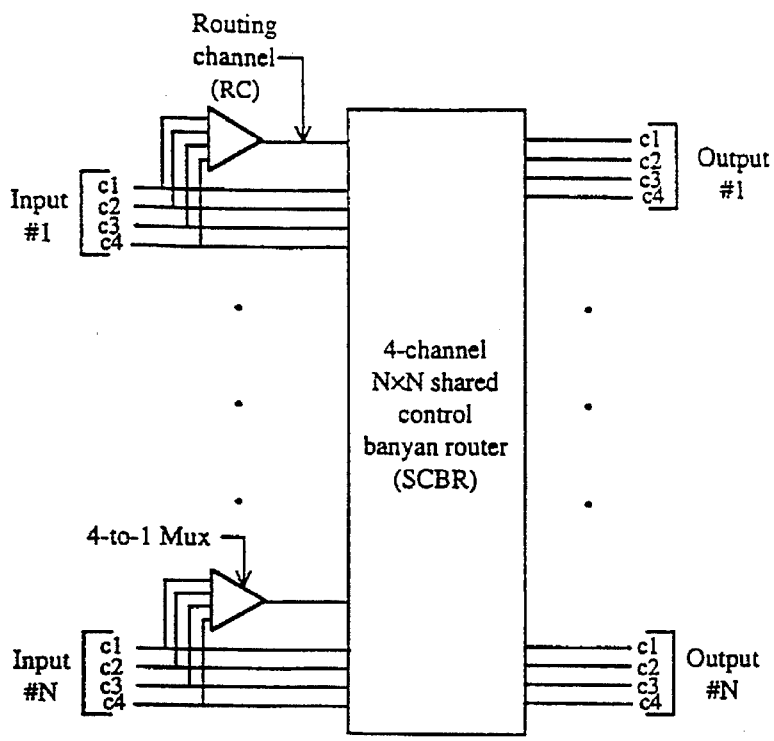
FIG. 16 is a block diagram illustrating a four-channel shared control banyan router and its switching elements.
Figure 16B:
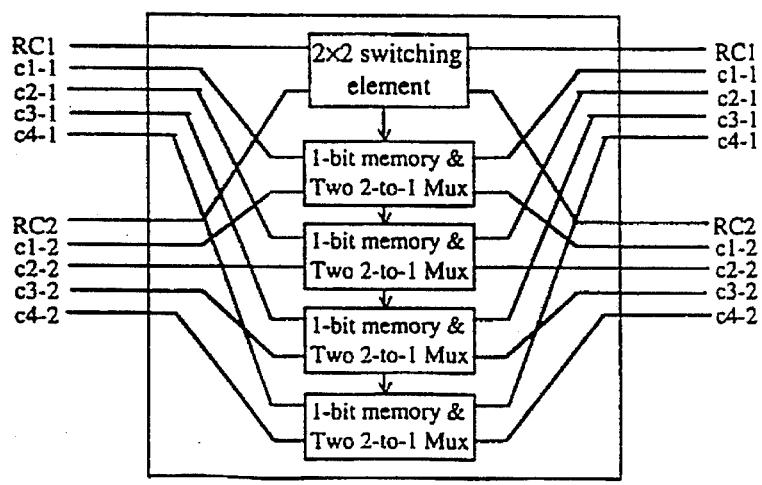

When C N×N banyan routers are used in the path of data packets, the hardware complexity and VLSI implementation complexity of a switch module can be reduced by using a C-channel N×N shared control banyan router in place of C N×N banyan routers, thus reducing the hardware complexity by a factor of about C/(1+C/3). This implementation is illustrated in FIG. 16. A C-channel N×N shared control banyan router consists of C data channels and one control channel. The control channel is shared by the C data channels in a pipelined manner only to set up routes through the banyan router. Due to the above pipelining, the channels are delayed at the input and/or output of the shared control banyan router if all the channels are concurrent and synchronization of all C channels at the shared control banyan router output is required. Shared control banyan router can be used in output group modules and input group modules to reduce their complexity.

Figure 15:
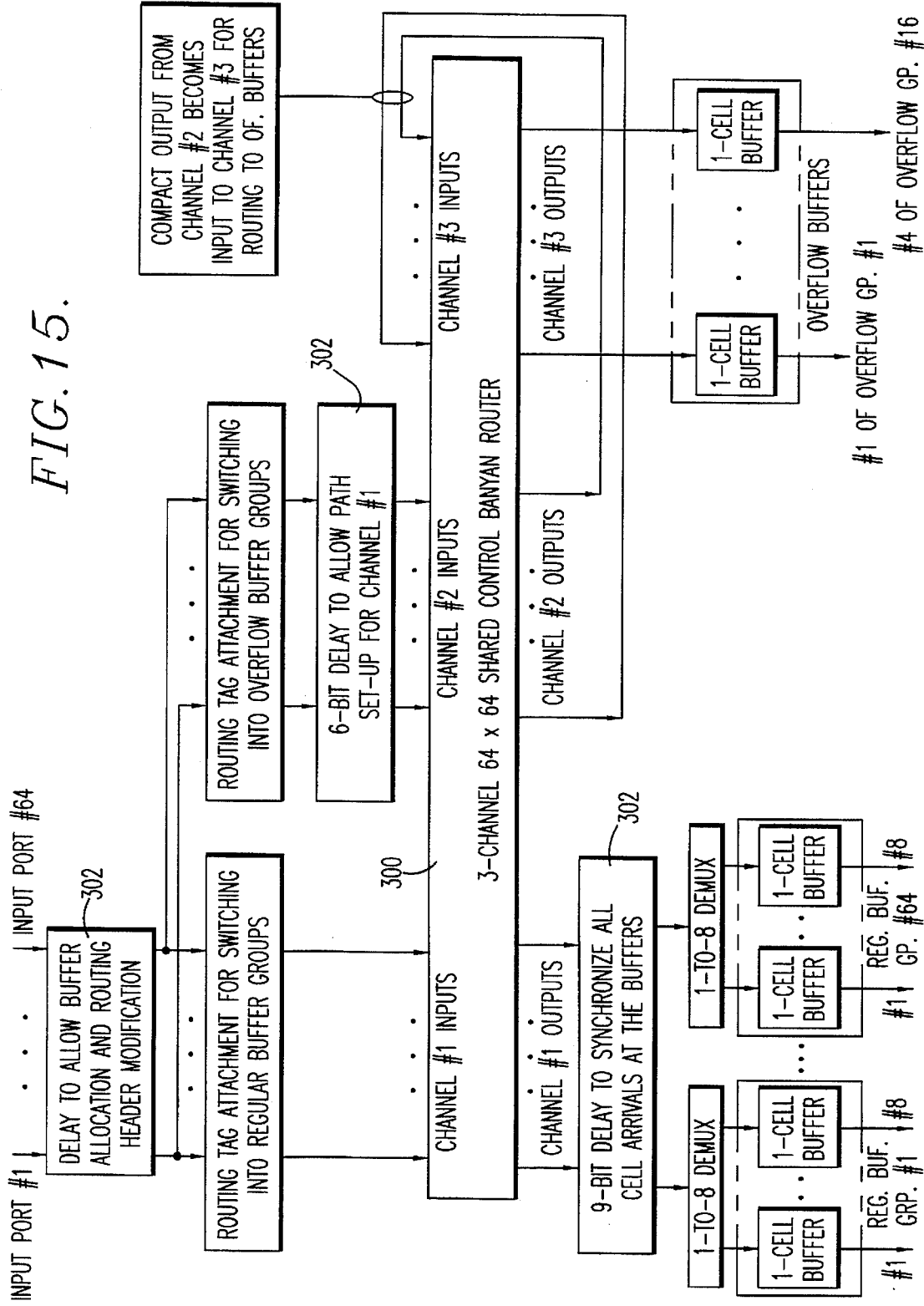
FIG. 15 is a block diagram illustrating a shared control banyan router.

In the output group modules shown in FIG. 5, three banyan routers of sizes 64×64, 64×16 and 16×16 and 16 1×8 demultiplexers for overflow buffers can be replaced by a 3-channel 64×64 shared control banyan router as illustrated in FIG. 15.

Similarly, the input group modules and broadcast and re-circulation modules described in Section II above can also be implemented using multi-channel shared control banyan routers to allow the development of a VLSI implementation of input group modules in a manner that the same VLSI chip can also be operated as broadcast and recirculation modules.

As illustrated in FIG. 12, each input group module includes four concentrators of the following sizes: 64×64, 16×8, 16×16, and 128×128. Each concentrator includes a recursive running adder to generate a routing tag, and a banyan router. Therefore, if a recursive running adder and router can be shared by multiple input sets, a significant simplification in complexity will result. The routing tag generation in the recursive running adder and the route set-up in the router take the same amount of time: 6-bit time each for a 64×64 concentrator. Therefore, as soon as the routing tag generation of one channel is completed, the processing of the next channel can start, and so on. Therefore, as illustrated in FIG. 15, all the above concentration functions can be performed using a 5-channel 64×64 concentrator, a plurality of delay networks and 64 additional 2×2 switching elements as follows:

A 64×64 concentrator can easily serve as a 16×8 or 16×16 concentrator. Using a 64×64 concentrator for the 16×8 concentrator and the 16×16 concentrator also provides ability to handle larger multicasting load if necessary. The 16×8 concentrator handles broadcast cells which do not go through various sorting and switching operations the other cells go through. Therefore, operation of the 16×8 concentrator can be delayed until the routing tag for the 16×16 concentrator has been generated without introducing any additional delay in the switching process. Thus, the operations of all of the concentrators can be easily done using three channels in a 5-channel 64×64 concentrator.

A 128×128 concentrator is easily implemented using two 64×64 concentrators followed by another stage of 64 2×2 switching elements with shuffled inputs coming from the two 64×64 concentrators. If the two 64×64 concentration operations for implementing a 128×128 concentrator as above are done sequentially, a 6-bit delay will be introduced in the process.

As seen in FIG. 12, the concentration function for the 128×128 concentrator starts after sorting in the input group module is completed and after the routing paths in the 16×8 concentrator and the 16×16 concentrator have been set-up. Therefore, two remaining channels of the 5-channel 64×64 concentrator along with a 6-bit delay in one channel and a stage of 64 2×2 switching elements can be used to perform the 128×128 concentrator functions.

Routing can also be performed with a shared control banyan router. As seen in FIG. 12, after the sorting, trapping and concentration processes, three 32×64 routers are used for switching cells to output group modules. Similarly, the three routers in FIG. 12 can easily be replaced by a 3-channel 32×64 shared control banyan router. While no delay is introduced in the first channel, a 6-bit delay in the second and a 12-bit delay in the third will have to be introduced due to the pipelining in shared control banyan routers. This however does not introduce any additional delay because when the inputs arrive in an output group module, the routing tags in the cells are examined sequentially. First 16 inputs in an output group module come from the first channel from the 16 input group modules. Hence, the delays introduced in the second and third channels at the 3-channel shared control banyan router are absorbed in the output group modules.

If desired, the 5-channel 64×64 shared control banyan router used for the concentration purposes can be used as a 3-channel shared control banyan router for routing purposes with two channels remaining unused. While this may appear to waste significant hardware, it eliminates the need to design a new router.

Finally, the broadcast and re-circulation module can also be formed with a shared control banyan router. As illustrated in FIG. 13, the broadcast and recirculation module requires one 64×64 concentrator for the broadcast submodule, and a 256×256 concentrator for the recirculation submodule. The 256×256 concentrator can be implemented using four 64×64 concentrators, a plurality of delay networks and two stages of 128 2×2 switching elements (a total of 256 switching elements). Therefore, by using a 5-channel 64×64 shared control banyan router the first channel can be used for the concentration function in the broadcast submodule, and the others in recirculation submodule. As in the above cases, channels 2, 3, 4, and 5 will have to be delayed by 6, 12, 18, and 24 bits. However, since recirculation lines have to be delayed until the next time slot for the alignment with the new cells, the delay at the shared control banyan router is absorbed within the above alignment delay. The recirculation submodule also requires an 80×80 sorter, and sixteen one-cell buffers for recirculation of the broadcast cells.

As discussed above, an input group module contains a 5-channel 64×64 shared control banyan router for concentration purposes, and a 128×128 sorter for sorting purposes.

The sorting fields in the cells in input group modules and in broadcast and re-circulation modules are identical. The input group modules also have about the same number of buffers needed by the broadcast and re-circulation module. Hence, an input group module can be designed in such a way that it can also be used as the broadcast and re-circulation module.

The above can be easily done by providing (i) capability of choosing one of the two sets of inputs at the 5-channel 64×64 shared control banyan router concentrator, 128×128 sorter and sixteen buffers, (ii) a second set of outputs from the above devices within the chip, and (iii) capability of choosing one of the two sets of outputs from the necessary number of output lines.

Although the invention has been described with reference to the preferred embodiments illustrated in the attached drawing figures, it is noted that equivalents may be employed and substitutions made herein without departing from the scope of the invention as recited in the claims. For example, although the preferred number of memory buffers, routing lines, recirculation lines, etc., have been selected in accordance with particular modeling parameters, the actual number of these components and devices depends upon specific operating requirements. Additionally, although the preferred two-stage asynchronous transfer packet switch and three-stage asynchronous transfer mode packet switch selects data packets destined for greater than 8 output ports to be broadcast, any number may be used as a cutoff between multicast and broadcast data packets without departing from the scope of the invention.

Having thus described the preferred embodiment of the invention, what is claimed as new and desired to be protected by Letters Patent includes the following:

1. An asynchronous transfer mode packet switch for routing packets between a plurality of communication devices, said packet switch comprising:

a plurality of input ports for receiving packets from a plurality of communication devices;

a plurality of output ports for delivering the received packets to a plurality of communication devices; and routing means for routing the packets from said input ports to said output ports, said routing means including a quantity of buffer groups equal to the quantity of said input ports for receiving and storing the packets from said input ports before delivery to said output ports, each of said buffer groups including a plurality of buffers for preventing packet blocking and packet loss within said routing means;

a buffer management module for allocating said buffers to the packets.

2. The packet switch as set forth in claim 1, said buffer management module including means for allocating said buffer groups and said buffers to said received data packets in sequential order for sharing said buffers among all of said output ports.

3. The packet switch as set forth in claim 1, including means for delivering a single broadcast packet to a plurality of output ports.

4. The packet switch as set forth in claim 3, said buffer management module including means for allocating a broadcast packet to a single memory buffer, means for determining the number of output ports the broadcast packet is destined for, means for counting the number of times the memory buffer storing the broadcast packet is read by the output ports, and means for releasing the memory buffer for another packet only after the memory buffer has been read by all the designated output ports.

5. The packet switch as set forth in claim 1 further including a plurality of read sequencers, each of said read sequencers being associated with a corresponding one of said output ports for receiving from said buffer management module a memory buffer address for indicating that a packet destined for its respective output port has been stored in that memory buffer.

6. The packet switch as set forth in claim 5, said read sequencers each including means for receiving a plurality of different memory buffer addresses from said buffer management module and for selecting the highest priority packet to be read next by its respective output port.

7. The packet switch as set forth in claim 6, said read sequencers each including means for sorting the plurality of different memory buffer addresses according to their priority for facilitating the selecting of the highest priority packet.

8. The packet switch as set forth in claim 1, said routing means further including a buffer switching module for routing packets from said buffers to said output ports.

9. The packet switch as set forth in claim 1, said routing means further including an input processing module for delaying packets received from said input ports for a predetermined amount of time before delivery to said buffer groups to allow said buffer management module time to allocate the packets among said buffer groups.

10. The packet switch as set forth in claim 9, said buffer management module including means for generating and delivering to said input processing module routing tags for routing the packets to the appropriate buffer groups.

11. The packet switch as set forth in claim 10, said input processing module including means for attaching said routing tags to the packets for routing the packets to the appropriate buffer groups.

12. An asynchronous transfer mode packet switch for routing packets from a plurality of input communication devices to a plurality of output communication devices, said packet switch comprising:

a plurality of input ports for receiving packets from a plurality of input communication devices;

a plurality of output ports for delivering the received packets to a plurality of communication devices;

a switch assembly for routing the packets from said input ports to said output ports, said switch assembly including a plurality of input group modules, each of said input group modules being coupled with a plurality of said input ports for receiving packets therefrom, said input group modules including a number of transfer paths for routing said packets, and a plurality of output group modules coupled with said input group modules for receiving packets routed over said transfer paths and for routing the packets to said output ports, each of said input group modules including means for separating the packets into unicast packets destined for a single output port, multicast packets destined for a plurality of output ports less than a predetermined number, and broadcast packets destined for a plurality of output ports greater than a predetermined number.

13. The packet switch as set forth in claim 12, said input group modules including means for copying each of said multicast packets to create a plurality of unicast packets for delivery to a plurality of single output ports.

14. The packet switch as set forth in claim 13, said input group modules including means for broadcasting each of said broadcast packets to all of said output ports.

15. The packet switch as set forth in claim 12, each of said input group modules including a sorter for sorting said unicast packets into groups of packets destined for each of said output group modules and for sorting said groups according to their priorities.

16. The packet switch as set forth in claim 15, each of said input group modules further including a trap network coupled with said sorter for selecting the highest priority packets for routing over said transfer paths.

17. The packet switch as set forth in claim 16, each of said input group modules further including a concentrator coupled with said trap network for concentrating the highest priority packets for routing over said transfer paths and for recirculating the lower priority packets to said sorter.

18. The packet switch as set forth in claim 17, each of said input group modules further including a plurality of routers for routing the concentrated highest priority packets to said output group modules over said transfer paths.

19. The packet switch as set forth in claim 12, each of said output group modules including
   a plurality of buffer groups for receiving and storing packets from said input group modules before delivery to said output ports; and
   a buffer management module for allocating the packets among said buffer groups,
   said output group modules including a number of buffer groups equal to the number of input ports for facilitating quick transfer of packets from said input module to said buffer groups, each of said buffer groups including a plurality of buffers for preventing packet blocking and packet loss within said output group module.

20. The packet switch as set forth in claim 19, said buffer management module including means for allocating received packets to said buffer groups in sequential order for sharing said memory buffers among all of said output ports.

21. The packet switch as set forth in claim 19, including means for delivering a single broadcast packet to a plurality of output ports.

22. The packet switch as set forth in claim 21, said buffer management module including means for allocating a broadcast packet to a single memory buffer, means for determining the number of output ports the broadcast packet is destined for, means for counting the number of times the memory buffer storing the broadcast packet is read by the output ports, and means for releasing the memory buffer for another packet only after the memory buffer has been read by all the designated output ports.

23. The packet switch as set forth in claim 19 further including a plurality of read sequencers, each of said read sequencers being associated with a corresponding one of said output ports for receiving from said buffer management module a memory buffer address for indicating that a packet destined for its respective output port has been stored in that memory buffer.

24. The packet switch as set forth in claim 23, said read sequences each including means for receiving a plurality of different memory buffer addresses from said buffer management module and for selecting the highest priority packet to be read next by its respective output port.

25. The packet switch as set forth in claim 24, said read sequencers each including means for sorting the plurality of different memory buffer addresses according to their priority for facilitating the selecting of the highest priority packet.

26. The packet switch as set forth in claim 19, said output group module further including a buffer switching module for routing packets from said memory buffers to said output ports.

27. The packet switch as set forth in claim 19, said output group module further including an input processing module for delaying packets received from said input ports for a predetermined amount of time before delivery to said buffer groups to allow said buffer management module time to allocate the packets among said buffer groups.

28. The packet switch as set forth in claim 27, said buffer management module including means for generating and delivering to said input processing module routing tags for routing the packets to the appropriate buffer groups.

29. The packet switch as set forth in claim said input processing module including means for attaching said routing tags to the packets for routing the packets to the appropriate buffer groups.

* * * * *